US012609752B2

(12) United States Patent
Song et al.

(10) Patent No.: US 12,609,752 B2
(45) Date of Patent: Apr. 21, 2026

(54) BEAM FAILURE PROCESSING METHOD, TERMINAL AND NETWORK DEVICE

(71) Applicant: DATANG MOBILE COMMUNICATIONS EQUIPMENT CO., LTD., Beijing (CN)

(72) Inventors: Lei Song, Beijing (CN); Runhua Chen, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 260 days.

(21) Appl. No.: 18/250,248

(22) PCT Filed: Oct. 22, 2021

(86) PCT No.: PCT/CN2021/125813
§ 371 (c)(1),
(2) Date: Apr. 24, 2023

(87) PCT Pub. No.: WO2022/083757
PCT Pub. Date: Apr. 28, 2022

(65) Prior Publication Data
US 2024/0030996 A1 Jan. 25, 2024

(30) Foreign Application Priority Data
Oct. 23, 2020 (CN) .......................... 202011149117.8

(51) Int. Cl.
H04B 7/06 (2006.01)
H04L 5/00 (2006.01)
(Continued)

(52) U.S. Cl.
CPC ....... H04B 7/06964 (2023.05); H04L 5/0048 (2013.01); H04W 24/04 (2013.01); H04W 24/10 (2013.01); H04W 72/046 (2013.01)

(58) Field of Classification Search
None
See application file for complete search history.

(56) References Cited

U.S. PATENT DOCUMENTS

| 2018/0302889 A1 | 10/2018 | Guo et al. |
| 2019/0081686 A1 | 3/2019 | Wang et al. |

(Continued)

FOREIGN PATENT DOCUMENTS

| CN | 110324069 A | 10/2019 |
| CN | 110945897 A | 3/2020 |

(Continued)

OTHER PUBLICATIONS

International Search Report and Written Opinion issued Apr. 13, 2023 in International Application No. PCT/CN2021/125813.

(Continued)

*Primary Examiner* — Walter J Divito
(74) *Attorney, Agent, or Firm* — Harness, Dickey & Pierce, P.L.C.

(57) ABSTRACT

A beam failure processing method, a terminal, and a network device are provided. The method includes: obtaining K beam failure recovery (BFR) procedures and a beam failure detection reference signal (BFD RS) set or a control resource set (CORESET) group corresponding to each of the K BFR procedures; where K is a positive integer; for each of the K BFR procedures, performing a beam failure processing according to a reference signal in the BFD RS set corresponding to the BFR procedure or a reference signal associated with the CORESET group corresponding to the BFR procedure; where the CORESET group includes at least one CORESET.

17 Claims, 3 Drawing Sheets

(51) Int. Cl.
  *H04W 24/04*  (2009.01)
  *H04W 24/10*  (2009.01)
  *H04W 72/044*  (2023.01)

(56)     References Cited

U.S. PATENT DOCUMENTS

| | | |
|---|---|---|
| 2019/0090226 A1 | 3/2019 | Wang et al. |
| 2021/0013950 A1 | 1/2021 | Yang et al. |
| 2021/0014022 A1 | 1/2021 | Yang |
| 2021/0282168 A1 | 9/2021 | Matsumura et al. |
| 2022/0416873 A1 | 12/2022 | Li |

FOREIGN PATENT DOCUMENTS

| | | |
|---|---|---|
| WO | WO-2019/184690 A1 | 10/2019 |
| WO | 2019/215389 A2 | 11/2019 |
| WO | 2020/012619 A1 | 1/2020 |
| WO | WO-2020/063126 A1 | 4/2020 |

OTHER PUBLICATIONS

AT&T, "In support of partial beam failure," 3GPP TSG RAN WG1 Meeting AH1801 R1-1800583, Jan. 11, 2018.

AT&T, "On beam recovery for partial and full control channel failure," 3GPP TSG RAN WG1 Meeting NR#3, R1-1716169, Sep. 11, 2017.

First Office Action issued Jun. 9, 2023 in Chinese Application No. 2020111491178.

First Office Action issued Apr. 13, 2023 in Taiwanese Application No. 110139168.

ITRI, "Discussion on beam management for Multi-TRP," 3GPP TSG RAN WG1 #102-e, R1-2006654, Aug. 17, 2020.

Extended European search report issued Jul. 3, 2024 in European Application No. 21882169.2.

Search Report for European Application No. 21882169.2 dated Mar. 6, 2024.

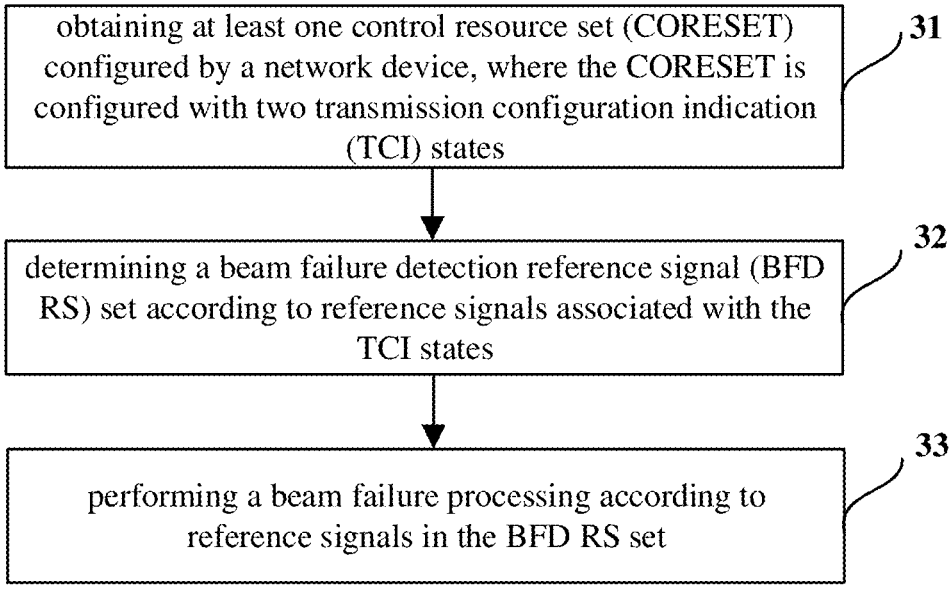

obtaining at least one control resource set (CORESET) configured by a network device, where the CORESET is configured with two transmission configuration indication (TCI) states ⟩31 determining a beam failure detection reference signal (BFD RS) set according to reference signals associated with the TCI states ⟩32 performing a beam failure processing according to reference signals in the BFD RS set ⟩33

FIG. 3

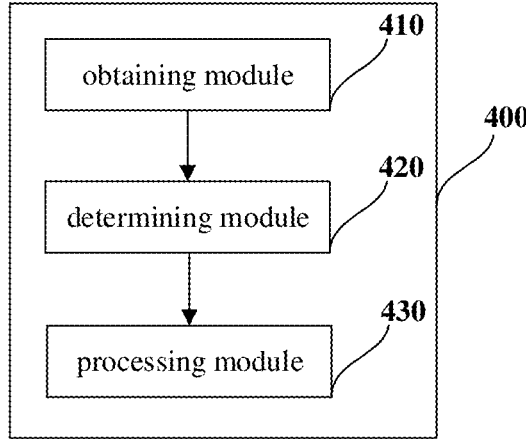

obtaining module 410 determining module 420 processing module 430

BEAM FAILURE PROCESSING METHOD, TERMINAL AND NETWORK DEVICE

CROSS-REFERENCE TO RELATED APPLICATIONS

The present disclosure is the U.S. national phase of PCT Application PCT/CN2021/125813 filed on Oct. 22, 2021, which claims a priority of Chinese patent application No. 202011149117.8 filed on Oct. 23, 2020, which is incorporated herein by reference in its entirety.

TECHNICAL FIELD

The present disclosure relates to the field of communications technologies, and in particular, to a beam failure processing method, a terminal, and a network device.

BACKGROUND

In a New Radio (NR) system, when a high frequency band is used for transmission, a physical channel and a physical signal may employ a beamforming technique to improve the transmission quality of data. Through the beamforming technique, the network device side may concentrate the transmission power in a certain direction (e.g., the direction in which the terminal is located) to increase the power of the received signal. However, when the link between the network device side and the terminal is blocked, the received power at the terminal side is greatly reduced, and a transmission (beam) failure event is caused. A beam failure recovery mechanism, also called a link recovery mechanism, is defined in the NR, and specifically, the method includes that a terminal reports a transmission failure event to a network device side after detecting the transmission failure event, and then the network device side changes a serving beam for the terminal, so as to ensure normal transmission.

In the NR system, a network device configures or pre-defines a set of beam failure detection reference signal (BFD RS) set for each serving cell of a terminal, where the reference signals in the set are used to reflect the beam quality of a Physical Downlink Control Channel (PDCCH), that is, the quality of a Transmission Configuration Indication (TCI) state. When the receiving power of all reference signals included in the set is lower than a specific threshold, the physical layer of the terminal equipment indicates a beam failure instance to the high layer of the terminal, and when the number of beam failure instance reaches a certain number in a certain time, the terminal equipment is triggered to send a beam failure recovery request to the network device side. New beam related information may also be included in the beam failure recovery request if the terminal side identifies a new available beam. After receiving a beam failure recovery request sent by the terminal, the network device side may update a new serving beam for the terminal.

However, when one cell includes multiple transmission reception points (TRPs) and the link quality between one TRP and the terminal is poor, the terminal does not report a beam failure event if the control channels of the other TRPs can still work normally. However, for a transmission reception point with poor link quality, normal communication with the terminal cannot be guaranteed. The terminal can initiate the beam failure recovery mechanism only when the link quality between all TRPs and the terminal is degraded, or can normally communicate after the link quality between the failed TRP and the terminal is recovered, so that a larger transmission delay can be generated for data transmission on the TRP with the earlier degraded link quality.

SUMMARY

The present disclosure provides a beam failure processing method, a terminal, and a network device, which solve the problem of poor communication performance of the beam failure processing method in the related art.

In order to achieve the above object, the embodiments of the present disclosure are provided as follows:

In a first aspect, a beam failure processing method is provided in an embodiment of the present disclosure, including:

obtaining K beam failure recovery (BFR) procedures and a beam failure detection reference signal (BFD RS) set or a control resource set (CORESET) group corresponding to each of the K BFR procedures; where K is a positive integer;

for each of the K BFR procedures, performing a beam failure processing according to a reference signal in the BFD RS set corresponding to the BFR procedure or a reference signal associated with the CORESET group corresponding to the BFR procedure;

where the CORESET group includes at least one CORESET.

Optionally, the obtaining the K BFR procedures and the BFD RS set or the CORESET group corresponding to each of the K BFR procedures include at least one of:

obtaining the K BFR procedures configured by a network device for a terminal and one BFD RS set configured by the network device for each of the K BFR procedures;

obtaining the K BFR procedures configured by a network device for a terminal and one CORESET group configured by the network device for each of the K BFR procedures;

obtaining the K BFR procedures configured by a network device for a terminal and determining, by the terminal, one CORESET group corresponding to each of the K BFR procedures according to a predefined rule;

obtaining K BFD RS sets configured by a network device for a terminal and determining, by the terminal, the K BFR procedures and one BFD RS set corresponding to each of the K BFR procedures according to a predefined rule;

determining, by a terminal, the K BFR procedures and one BFD RS set corresponding to each of the K BFR procedures according to a predefined rule; and determining, by a terminal, the K BFR procedures and one CORESET group corresponding to each of the K BFR procedures according to a predefined rule.

Optionally, the determining by the terminal one CORESET group corresponding to each of the K BFR procedures according to the predefined rule includes:

determining one CORESET group corresponding to each of the K BFR procedures according to a number K of the BFR procedures and a higher-layer parameter of the CORESET.

Optionally, the determining by the terminal the K BFR procedures and the CORESET group corresponding to each of the K BFR procedures according to the predefined rule includes at least one of:

determining the number K of the BFR procedures as a number of higher-layer parameter values of CORESET; and determining the CORESET with a higher-layer parameter value of CORESET being a specific value included in the CORESET group corresponding to one BFR procedure in the K BFR procedures.

Optionally, the reference signal associated with the CORESET group is at least one reference signal in quasi-co-location (QCL) parameters of a CORESET in the CORESET group.

Optionally, the performing the beam failure processing according to the reference signal in the BFD RS set corresponding to the BFR procedure or the reference signal associated with the CORESET group corresponding to the BFR procedure:

when measurement values of all reference signals corresponding to a first BFR procedure are detected to be worse than a first threshold, reporting, to a network device, at least one of an index of the first BFR procedure, an index of the reference signal corresponding to the first BFR procedure, an index of the BFD RS set corresponding to the first BFR procedure, an index of the CORESET corresponding to the first BFR procedure, and an index of the CORESET group corresponding to the first BFR procedure;

where the first BFR procedure is any one of the K BFR procedures.

In a second aspect, a terminal is provided in an embodiment of the present disclosure, including: a transceiver, a memory, a processor and a program stored on the memory and executable on the processor, where the processor executes the program to perform:

obtaining K beam failure recovery (BFR) procedures and a beam failure detection reference signal (BFD RS) set or a control resource set (CORESET) group corresponding to each of the K BFR procedures; where K is a positive integer;

for each of the K BFR procedures, performing a beam failure processing according to a reference signal in the BFD RS set corresponding to the BFR procedure or a reference signal associated with the CORESET group corresponding to the BFR procedure;

where the CORESET group includes at least one CORESET.

Optionally, the processor executes the program to perform at least one of:

obtaining the K BFR procedures configured by a network device for a terminal and one BFD RS set configured by the network device for each of the K BFR procedures;

obtaining the K BFR procedures configured by a network device for a terminal and one CORESET group configured by the network device for each of the K BFR procedures;

obtaining the K BFR procedures configured by a network device for a terminal and determining, by the terminal, one CORESET group corresponding to each of the K BFR procedures according to a predefined rule;

obtaining K BFD RS sets configured by a network device for a terminal and determining, by the terminal, the K BFR procedures and one BFD RS set corresponding to each of the K BFR procedures according to a predefined rule;

determining, by a terminal, the K BFR procedures and one BFD RS set corresponding to each of the K BFR procedures according to a predefined rule; and determining, by a terminal, the K BFR procedures and one CORESET group corresponding to each of the K BFR procedures according to a predefined rule.

Optionally, the processor executes the program to perform:

determining one CORESET group corresponding to each of the K BFR procedures according to a number K of the BFR procedures and a higher-layer parameter of the CORESET.

Optionally, the processor executes the program to perform at least one of:

determining the number K of the BFR procedures as a number of higher-layer parameter values of CORESET; and determining the CORESET with a higher-layer parameter value of CORESET being a specific value included in the CORESET group corresponding to one BFR procedure in the K BFR procedures.

Optionally, the reference signal associated with the CORESET group is at least one reference signal in quasi-co-location (QCL) parameters of a CORESET in the CORESET group.

Optionally, the processor executes the program to perform:

when measurement values of all reference signals corresponding to a first BFR procedure are detected to be worse than a first threshold, reporting, to a network device, at least one of an index of the first BFR procedure, an index of the reference signal corresponding to the first BFR procedure, an index of the BFD RS set corresponding to the first BFR procedure, an index of the CORESET corresponding to the first BFR procedure, and an index of the CORESET group corresponding to the first BFR procedure;

where the first BFR procedure is any one of the K BFR procedures.

In a third aspect, a terminal is provided in an embodiment of the present disclosure, including:

an obtaining module, configured to obtain K beam failure recovery (BFR) procedures and a beam failure detection reference signal (BFD RS) set or a control resource set (CORESET) group corresponding to each of the K BFR procedures; where K is a positive integer;

a processing module, configured to, for each of the K BFR procedures, perform a beam failure processing according to a reference signal in the BFD RS set corresponding to the BFR procedure or a reference signal associated with the CORESET group corresponding to the BFR procedure;

where the CORESET group includes at least one CORESET.

In a fourth aspect, a beam failure processing method is provide in an embodiment of the present disclosure, which is applied to a terminal and includes:

obtaining at least one control resource set (CORESET) configured by a network device, where the CORESET is configured with two transmission configuration indication (TCI) states;

determining a beam failure detection reference signal (BFD RS) set according to reference signals associated with the TCI states; and performing a beam failure processing according to reference signals in the BFD RS set.

Optionally, the BFD RS set includes at least one of:

a first reference signal set and a second reference signal set;

a third reference signal set;

where the first reference signal set includes: a reference signal associated with a first TCI state of the two TCI states configured for at least one of the CORESET, or reference signals associated with a part of quasi-colocation D type (QCL-TypeD) of the first TCI state, or reference signals associated with all QCL-TypeD of the first TCI state;

the second reference signal set includes: a reference signal associated with a second TCI state of the two TCI states configured for at least one of the CORESET, or reference signals associated with a part of QCL-TypeD of the second TCI state, or reference signals associated with all QCL-TypeD of the second TCI state;

the third reference signal set includes: reference signals associated with the two TCI states of a target CORESET, or reference signals associated with a part of QCL-TypeD of the two TCI states of a target CORESET, or reference signals associated with all QCL-TypeD of the two TCI states of a target CORESET, where the target CORESET is one of the at least one CORESET, or all of the at least one CORESET.

Optionally, the first TCI state is a TCI state corresponding to a port with a lowest index of a Physical downlink control channel Demodulation Reference Signal (PDCCH DMRS);

the second TCI state is a TCI state corresponding to a port with a next lowest index or a highest index of the PDCCH DMRS; where the next lowest index is higher than the lowest index.

Optionally, when the target CORESET is one of the at least one CORESET, the target CORESET is a CORESET with a lowest index in the at least one CORESET, or a CORESET of which a higher-layer parameter value is a specific value in the at least one CORESET, or any one of the at least one target CORESET.

Optionally, the performing the beam failure processing according to the reference signals in the BFD RS set includes:

when the BFD RS includes a first reference signal set and a second reference signal set, reporting a beam failure event to the network device when measurement values of all reference signals in the first reference signal set or the second reference signal set are detected to be worse than a first threshold; or when the BFD RS includes a third reference signal set, reporting a beam failure event to the network device when the measurement values of all reference signals in the third reference signal set are detected to be worse than a first threshold; or when the BFD RS includes a third reference signal set, reporting a beam failure event to the network device when the measurement values of all reference signals associated with one TCI state in the third reference signal set are detected to be worse than a first threshold.

Optionally, the reporting the beam failure event to the network device includes:

reporting a candidate beam corresponding to the first reference signal set to the network device when the measurement values of all reference signals in the first reference signal set are detected to be worse than the first threshold; or reporting a candidate beam corresponding to the second reference signal set to the network device when the measurement values of all reference signals in the second reference signal set are detected to be worse than the first threshold; or reporting two candidate beams corresponding to the third reference signal set to the network device when the measurement values of all reference signals in the third reference signal set are detected to be worse than a first threshold; or when the measurement values of all reference signals associated with one TCI state in the third reference signal set are detected to be worse than a first threshold, reporting candidate beams corresponding to a set including all reference signal associated with the one TCI state to the network device; or when the measurement values of all reference signals associated with one TCI state in the third reference signal set are detected to be worse than a first threshold, reporting two candidate beams corresponding to the third reference signal set to the network device.

In a fifth aspect, a terminal is provided in an embodiment of the present disclosure, including: a transceiver, a memory, a processor, and a program stored on the memory and executable on the processor, where the processor executes the program to perform:

obtaining at least one control resource set (CORESET) configured by a network device, where the CORESET is configured with two transmission configuration indication (TCI) states;

determining a beam failure detection reference signal (BFD RS) set according to reference signals associated with the TCI states; and performing a beam failure processing according to reference signals in the BFD RS set.

Optionally, the BFD RS set includes at least one of:

a first reference signal set and a second reference signal set;

a third reference signal set;

where the first reference signal set includes: a reference signal associated with a first TCI state of the two TCI states configured for at least one of the CORESET, or reference signals associated with a part of quasi-co-location D type (QCL-TypeD) of the first TCI state, or reference signals associated with all QCL-TypeD of the first TCI state;

the second reference signal set includes: a reference signal associated with a second TCI state of the two TCI states configured for at least one of the CORESET, or reference signals associated with a part of QCL-TypeD of the second TCI state, or reference signals associated with all QCL-TypeD of the second TCI state;

the third reference signal set includes: reference signals associated with the two TCI states of a target CORESET, or reference signals associated with a part of QCL-TypeD of the two TCI states of a target CORESET, or reference signals associated with all QCL-TypeD of the two TCI states of a target CORESET, wherein the target CORESET is one of the at least one CORESET, or all of the at least one CORESET.

Optionally, the first TCI state is a TCI state corresponding to a port with a lowest index of a Physical downlink control channel Demodulation Reference Signal (PDCCH DMRS);

the second TCI state is a TCI state corresponding to a port with a next lowest index or a highest index of the PDCCH DMRS; where the next lowest index is higher than the lowest index.

Optionally, when the target CORESET is one of the at least one CORESET, the target CORESET is a CORESET with a lowest index in the at least one CORESET, or a CORESET of which a higher-layer parameter value is a specific value in the at least one CORESET, or any one of the at least one target CORESET.

Optionally, the processor executes the program to perform:

when the BFD RS includes a first reference signal set and a second reference signal set, reporting a beam failure event to the network device when measurement values of all reference signals in the first reference signal set or the second reference signal set are detected to be worse than a first threshold; or when the BFD RS includes a third reference signal set, reporting a beam failure event to the network device when the measurement values of all reference signals in the third reference signal set are detected to be worse than a first threshold; or when the BFD RS includes a third reference signal set, reporting a beam failure event to the network device when the measurement values of all reference signals associated with one TCI state in the third reference signal set are detected to be worse than a first threshold.

Optionally, the processor executes the program to perform:

reporting a candidate beam corresponding to the first reference signal set to the network device when the measurement values of all reference signals in the first reference signal set are detected to be worse than the first threshold; or reporting a candidate beam corresponding to the second reference signal set to the network device when the measurement values of all reference signals in the second reference signal set are detected to be worse than the first threshold; or reporting two candidate beams corresponding to the third reference signal set to the network device when the measurement values of all reference signals in the third reference signal set are detected to be worse than a first threshold; or when the measurement values of all reference signals associated with one TCI state in the third reference signal set are detected to be worse than a first threshold, reporting candidate beams corresponding to a set including all reference signal associated with the one TCI state to the network device; or when the measurement values of all reference signals associated with one TCI state in the third reference signal set are detected to be worse than a first threshold, reporting two candidate beams corresponding to the third reference signal set to the network device.

In a sixth aspect, a terminal is provided in an embodiment of the present disclosure, including:

an obtaining module, configured to obtain at least one control resource set (CORESET) configured by a network device, where the CORESET is configured with two transmission configuration indication (TCI) states;

a determining module, configured to determine a beam failure detection reference signal (BFD RS) set according to reference signals associated with the TCI states;

a processing module, configured to perform a beam failure processing according to a reference signal in the BFD RS set.

In a seventh aspect, a beam failure processing method is provided in an embodiment of the present disclosure, which is applied to a network device includes:

configuring K beam failure recovery (BFR) procedures for a terminal, and/or configuring a beam failure detection reference signal (BFD RS) set or a control resource set (CORESET) group corresponding to each of the K BFR procedures for a terminal;

the BFD RS set or the CORESET group is configured to instruct the terminal to perform a beam failure processing for each of the K BFR procedures; the CORESET group includes at least one CORESET, and K is a positive integer.

Optionally, the configuring the K BFR procedures for the terminal and/or configuring the BFD RS set or the CORESET group corresponding to each of the K BFR procedures for the terminal includes at least one of:

configuring the K BFR procedures and configuring one BFD RS set for each of the K BFR procedures, for the terminal;

configuring the K BFR procedures and configuring one CORESET group for each of the K BFR procedures, for the terminal;

configuring the K BFR procedures for the terminal;

configuring K BFD RS sets for the terminal; and configuring K CORESET groups for the terminal.

In an eighth aspect, a network device is provided in an embodiment of the present disclosure, including: a transceiver, a memory, a processor, and a program stored on the memory and executable on the processor, where the processor executes the program to perform:

configuring K beam failure recovery (BFR) procedures for a terminal, and/or configuring a beam failure detection reference signal (BFD RS) set or a control resource set (CORESET) group corresponding to each of the K BFR procedures for a terminal;

the BFD RS set or the CORESET group is configured to instruct the terminal to perform a beam failure processing for each of the K BFR procedures; the CORESET group includes at least one CORESET, and K is a positive integer.

Optionally, the processor executes the program to perform at least one of:

configuring the K BFR procedures and configuring one BFD RS set for each of the K BFR procedures, for the terminal;

configuring the K BFR procedures and configuring one CORESET group for each of the K BFR procedures, for the terminal;

configuring the K BFR procedures for the terminal;

configuring K BFD RS sets for the terminal; and configuring K CORESET groups for the terminal.

In a ninth aspect, a network device is provided in an embodiment of the present disclosure, including:

a configuring module, configured to configure K beam failure recovery (BFR) procedures for a terminal, and/or configuring a beam failure detection reference signal (BFD RS) set or a control resource set (CORESET) group corresponding to each of the K BFR procedures for a terminal;

the BFD RS set or the CORESET group is configured to instruct the terminal to perform a beam failure processing for each of the K BFR procedures; the CORESET group includes at least one CORESET, and K is a positive integer.

In a tenth aspect, a readable storage medium is provided in an embodiment of the present disclosure, where the program is executed by a computer to perform the beam failure processing method according to the first aspect, the fourth aspect, or the seventh aspect.

The beneficial effect of the present disclosure is: when the terminal obtains K BFR procedures and the BFD RS sets or the CORESET groups corresponding to the K BFR procedures, the terminal may, for each BFR procedure, perform a beam failure processing according to a reference signal in the BFD RS set corresponding to the BFR procedure or a reference signal associated with the CORESET group corresponding to the BFR procedure. Therefore, it may be guaranteed that the terminal can report in time when a part of the transmissions fails, thereby solving the issues of poor communication performance in the beam failure transmission method in the related art, and helping to reduce the transmission delay.

BRIEF DESCRIPTION OF THE DRAWINGS

FIG. 3 is a second flow chart of a beam failure processing method at a terminal side in an embodiment of the present disclosure;

FIG. 4 is a second block diagram of a terminal in an embodiment of the present disclosure;

FIG. 7 is a first block diagram of a network device in an embodiment of the present disclosure.

DETAILED DESCRIPTION

Figure 1:
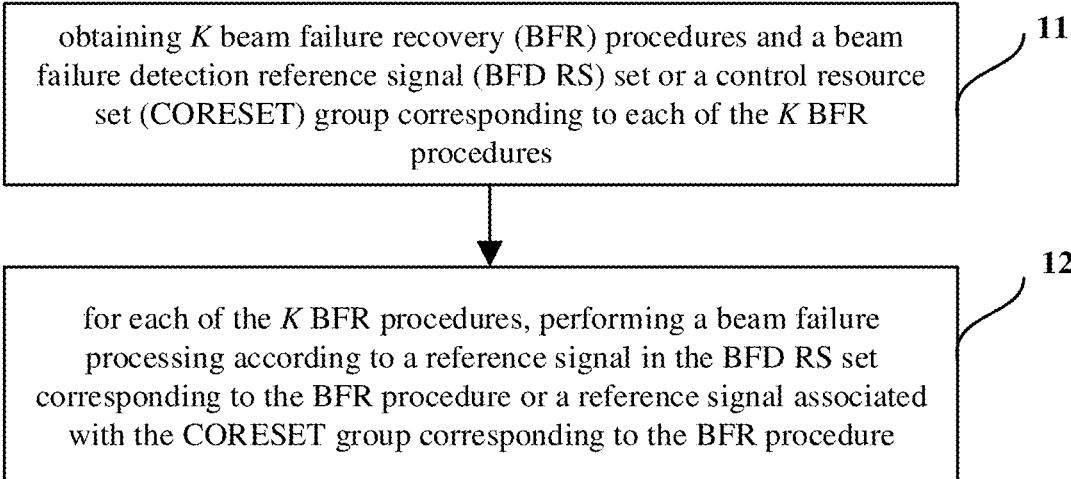
FIG. 1 is a first flow chart of a beam failure processing method at a terminal side in an embodiment of the present disclosure.

To make the technical problems, technical solutions and advantages to be solved by the present disclosure clearer, the following detailed description is made with reference to the accompanying drawings and specific embodiments. In the following description, specific details are provided, such as specific configurations and components, merely to facilitate a thorough understanding of embodiments of the disclosure. Accordingly, it will be apparent to those skilled in the art that various changes and modifications can be made to the embodiments described herein without departing from the scope and spirit of the disclosure. In addition, descriptions of well-known functions and constructions are omitted for clarity and conciseness.

It should be appreciated that reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In various embodiments of the present disclosure, it should be understood that the sequence numbers of the following processes do not mean the execution sequence, and the execution sequence of each process should be determined by the function and the inherent logic thereof, and should not constitute any limitation to the implementation process of the embodiments of the present disclosure.

Additionally, the terms "system" and "network" are often used interchangeably herein.

In the embodiments provided herein, it should be understood that "B corresponding to a" means that B is associated with a from which B can be determined. It should also be understood that determining B from a does not mean determining B from a alone, but may also be determined from a and/or other information.

In the embodiment of the present disclosure, the access network may be an access network including a Macro Base Station (Macro Base Station), a Pico Base Station (Pico Base Station), a Node B (3G mobile Base Station), an enhanced Base Station (eNB), a 5G mobile Base Station (gNB), a Home enhanced Base Station (Femto eNB or Home eNode B or Home eNB or HeNB), a relay Station, an access point, an RRU (Remote Radio Unit), an RRH (Remote Radio Head), and the like. The user terminal may be a mobile phone (or handset), or other device capable of sending or receiving wireless signals, including user Equipment, a Personal Digital Assistant (PDA), a wireless modem, a wireless communicator, a handheld device, a laptop computer, a cordless telephone, a Wireless Local Loop (WLL) station, a CPE (Customer premises Equipment) or mobile smart hotspot capable of converting mobile signals into WiFi signals, a smart appliance, or other device capable of autonomously communicating with a mobile communication network without human operation, etc.

Specifically, embodiments of the present disclosure provide a beam failure processing method, which solves the problem of poor communication performance in the beam failure processing method in the related art.

Optionally, the beam failure described in the embodiment of the present disclosure is equivalent to a transmission failure, a link failure between the TRP and the terminal, and the like, and the failure is also equivalent to a failure, and a plurality of descriptions and meanings thereof may be replaced with each other in the following description.

As shown in FIG. 1, an embodiment of the present disclosure provides a beam failure processing method, which is applied to a terminal, and the method includes:

Step 11: obtaining K beam failure recovery (BFR) procedures and a beam failure detection reference signal (BFD RS) set or a control resource set (CORESET) group corresponding to each of the K BFR procedures; where K is a positive integer.

Optionally, the K beam failure recovery (BFR) procedures may be configured by the network device for the terminal, or may be determined by the terminal according to a predefined rule. The BFD RS set or the CORESET group corresponding to the K BFR procedures may be: one BFD RS set or one CORESET configured by the network device for each BFR procedure, or may be one BFD RS set or one CORESET group corresponding to each BFR procedure determined by the terminal according to a predefined rule, and the following embodiments will be specifically described.

Step 12: for each of the K BFR procedures, performing a beam failure processing according to a reference signal in the BFD RS set corresponding to the BFR procedure or a reference signal associated with the CORESET group corresponding to the BFR procedure.

Optionally, the beam failure processing may include beam failure detection and reporting.

The CORESET group includes at least one CORESET.

In this embodiment, when the terminal obtains K BFR procedures and the BFD RS sets or the CORESET groups corresponding to the K BFR procedures, the terminal may, for each BFR procedure, perform a beam failure processing according to a reference signal in the BFD RS set corresponding to the BFR procedure or a reference signal associated with the CORESET group corresponding to the BFR procedure. Therefore, it may be guaranteed that the terminal can report in time when a part of the transmissions fails, thereby solving the issues of poor communication performance in the beam failure transmission method in the related art, and helping to reduce the transmission delay; and when it is not shown that the network device configures BFD RS set, the terminal can determine whether to report the beam failure aiming at partial transmission or aiming at the whole cell according to the configured BFR procedure.

Optionally, the obtaining the K BFR procedures and the BFD RS set or the CORESET group corresponding to each of the K BFR procedures include at least one of:

Method 1: obtaining the K BFR procedures configured by a network device for a terminal and one BFD RS set configured by the network device for each of the K BFR procedures.

Optionally, the network device configures K BFR procedures for each Bandwidth Part (BWP) of each serving cell (serving cell) of the terminal, or the network device configures K BFR procedures for all Bandwidth parts of each serving cell of the terminal, where each BFR procedure configures one BFD RS set.

Method 2: obtaining the K BFR procedures configured by a network device for a terminal and one CORESET group configured by the network device for each of the K BFR procedures.

Optionally, the network device configures K BFR procedures for each bandwidth part of each serving cell of the terminal, or the network device configures K BFR procedures for all bandwidth parts of each serving cell of the terminal; where each BFR procedure configures one CORE-SET, where, one CORESET may include at least one CORE-SET.

Method 3: obtaining the K BFR procedures configured by a network device for a terminal and determining, by the terminal, one CORESET group corresponding to each of the K BFR procedures according to a predefined rule.

Optionally, the network device configures K BFR procedures for each bandwidth part of each serving cell of the terminal, or the network device configures K BFR procedures for all bandwidth parts of each serving cell of the terminal; the terminal determines a CORESET for each BFR procedure through a predefined rule, where, one CORESET may include at least one CORESET.

Optionally, the determining by the terminal one CORE-SET group corresponding to each of the K BFR procedures according to the predefined rule includes:

determining one CORESET group corresponding to each of the K BFR procedures according to a number K of the BFR procedures and a higher-layer parameter of the CORESET.

For example: when each BWP is explicitly configured with 1 BFR procedure, BFR procedure 1 may be predefined in the specification to include a CORESET whose value of a higher-layer parameter (such as a control resource set pool index CORESETpoolIndex) is 0 or configured with no CORESETpoolIndex parameter; or, BFR procedure 1 includes CORESET with CORESETpoolIndex value of 1; alternatively, the BFR procedure 1 includes CORESET with CORESETpoolIndex value 0, CORESET with CORESET-poolIndex value 1, and CORESET without CORESETpoolIndex parameter (i.e., all CORESETs).

Another example is: when each BWP is explicitly configured with two BFR procedures, BFR procedure 1 may be predefined in the specification to include a CORESET with a CORESETpoolIndex value of 0 or without configuring a CORESETpoolIndex parameter; BFR procedure 2 includes CORESET with CORESETpoolIndex value of 1.

Another example is: when each BWP is explicitly configured with three BFR procedures, BFR procedure 1 may be predefined in the specification to include a CORESET with a CORESETpoolIndex value of 0 or without configuring a CORESETpoolIndex parameter; BFR procedure 2 includes the CORESET with CORESETpoolIndex value of 1, and process 3 includes all CORESETs on the BWP where it is located.

Of course, the above is only a schematic illustration of the corresponding relationship between the BFR procedure index and the CORESETpoolIndex value, and the embodiments of the present disclosure may not be limited to the combination in the above examples.

Method 4: obtaining K BFD RS sets configured by a network device for a terminal and determining, by the terminal, the K BFR procedures and one BFD RS set corresponding to each of the K BFR procedures according to a predefined rule.

Optionally, the network device configures K BFD RS sets for the terminal, and the terminal may determine, according to a predefined rule, that the number of BFR procedures is K, and determine, according to the predefined rule, one BFD RS set corresponding to each BFR procedure.

For example: when the network device explicitly configures K BFD RS sets for the terminal (e.g., on a BWP of a cell), the terminal determines that the number of BFR procedures on the BWP is K, and determines a BFD RS set corresponding to each BFR procedure.

Method 5: determining, by a terminal, the K BFR procedures and one BFD RS set corresponding to each of the K BFR procedures according to a predefined rule.

Optionally, the terminal may determine that the number K of the BFR procedures is the number of BFD RS sets configured by the network device, and/or determine one BFD RS set corresponding to one BFR procedure.

Method 6: determining, by a terminal, the K BFR procedures and one CORESET group corresponding to each of the K BFR procedures according to a predefined rule.

Optionally, the terminal may determine the number K of BFR procedures according to the number of values of the higher-layer parameters of the CORESET, and determine a CORESET corresponding to each BFR procedure.

For example: when the CORESET configured for the terminal by the network device includes two different CORESETpoolIndex values (0 and 1), the terminal can determine that the BFR procedure number on the BWP is 2 according to the rule agreed by the specification; where, the BFR procedure 1 includes CORESET with CORESET-poolIndex value of 0 or without CORESETpoolIndex parameter configuration, and the BFR procedure 2 includes CORESET with CORESETpoolIndex value of 1.

Another example is: when the CORESET configured for the terminal by the network device includes two different CORESETpoolIndex values (0 and 1), the terminal may determine, according to a rule agreed by the specification, that the number of BFR procedures on the BWP is 3, where BFR procedure 1 includes CORESET with CORESET-poolIndex value of 0 or without configuration of CORESET-poolIndex parameter, BFR procedure 2 includes CORESET with CORESETpoolIndex value of 1, and process 3 includes all CORESETs on the BWP where the CORESET is located.

Another example is: when the CORESET configured for the terminal by the network device includes a CORESET-poolIndex value (0 or 1) or all CORESETpoolIndex parameters are not configured, the terminal determines that the BFR procedure number on the BWP is 1, and the BFR procedure 1 includes all CORESETETs.

Optionally, the terminal may determine the number K of the BFR procedures as a number of higher-layer parameter values of CORESET, and/or the terminal may determine the CORESET with a higher-layer parameter value of CORESET being a specific value included in the CORESET group corresponding to one BFR procedure.

For example: when the CORESET configured for the terminal by the network device includes two different CORESETpoolIndex values (0 and 1), the terminal can determine that the BFR procedure number on the BWP is 2 according to the rule agreed by the specification; where, the BFR procedure 1 includes CORESET with CORESETpoolIndex value of 0 or without CORESETpoolIndex parameter configuration, and the BFR procedure 2 includes CORESET with CORESETpoolIndex value of 1.

Another example is: when the CORESET configured for the terminal by the network device includes a CORESETpoolIndex value (0 or 1) or all CORESETpoolIndex parameters are not configured, the terminal determines that the BFR procedure number on the BWP is 1, and the BFR procedure 1 includes all CORESETETs.

Optionally, when the network device configures K CORESETs for the terminal, the terminal may determine that the number K of BFR procedures is the number of CORESET configured for the network device, and determine, according to a predefined rule, one CORESET group corresponding to each BFR procedure, such as: a CORESET group corresponding to a BFR procedure includes CORESET with the value of the higher-layer parameter of CORESET as a specific value.

Optionally, the reference signal associated with the CORESET group is at least one reference signal in quasi-co-location (QCL) parameters of a CORESET in the CORESET group.

Optionally, the performing the beam failure processing according to the reference signal in the BFD RS set corresponding to the BFR procedure or the reference signal associated with the CORESET group corresponding to the BFR procedure:

when measurement values of all reference signals corresponding to a first BFR procedure are detected to be worse than a first threshold, reporting, to a network device, at least one of an index of the first BFR procedure, an index of the reference signal corresponding to the first BFR procedure, an index of the BFD RS set corresponding to the first BFR procedure, an index of the CORESET corresponding to the first BFR procedure, and an index of the CORESET group corresponding to the first BFR procedure. Being worse than the first threshold may represent being larger than the first threshold or being smaller than the first threshold. Optionally, in the case that the measurement value of the reference signal larger than the first threshold is the measurement value of the demand, being worse than the first threshold may represent being larger than the first threshold; alternatively, in the case that the measurement value of the reference signal being smaller than the first threshold is the measurement value of demand, being worse than the first threshold may represent being smaller than the first threshold. Optionally, in the case that the measurement value of the reference signal being larger than the first threshold is the measurement value of demand, being worse than the first threshold may indicate being smaller than the first threshold; alternatively, in the case that the measurement value of the reference signal being smaller than the first threshold is the measurement value of demand, being worse than the first threshold may represent being larger than the first threshold. The present disclosure does not limit herein, and the scheme only limits that the reporting of the relevant parameters of the network device needs to have certain conditions.

The first BFR procedure is any one of the K BFR procedures.

For example: the terminal obtains a BFD RS set corresponding to each BFR procedure, and if it is detected that measurement values of all reference signals in the BFD RS set corresponding to the first BFR procedure are worse than a first threshold when a beam failure is processed according to the reference signals in the BFD RS set corresponding to the BFR procedure, the terminal may report at least one of an index of the first BFR procedure, an index of the reference signal corresponding to the first BFR procedure, and an index of the BFD RS set corresponding to the first BFR procedure to the network device.

Another example is: the terminal obtains a CORESET group corresponding to each BFR procedure, and under the condition of performing beam failure processing according to reference signals associated with the CORESET group corresponding to the BFR procedure, if it is detected that all reference signals associated with the CORESET group corresponding to the first BFR procedure are worse than a first threshold, the terminal may report at least one of an index of the first BFR procedure, an index of the reference signal corresponding to the first BFR procedure, an index of the CORESET group corresponding to the first BFR procedure, and an index of a reference signal set associated with the CORESET group corresponding to the first BFR procedure to the network device.

Optionally, when reporting, the terminal may report a new set of candidate beams for each BFR procedure or CORESET or BFD RS set.

Optionally, when the network device configures K CORESET for the terminal, the terminal may further determine a BFD RS set according to reference signal related to CORESET which is configured with two Transmission Configuration Indication (TCI) states; and performing beam failure processing according to the reference signal of the BFD RS.

Optionally, the BFD RS set includes at least one of:

a first reference signal set and a second reference signal set;

a third reference signal set;

where the first reference signal set includes: a reference signal associated with a first TCI state of the two TCI states configured for at least one of the CORESET, or reference signals associated with a part of quasi-co-location D type (QCL-TypeD) of the first TCI state, or reference signals associated with all QCL-TypeD of the first TCI state;

the second reference signal set includes: a reference signal associated with a second TCI state of the two TCI states configured for at least one of the CORESET, or reference signals associated with a part of QCL-TypeD of the second TCI state, or reference signals associated with all QCL-TypeD of the second TCI state;

the third reference signal set includes: reference signals associated with the two TCI states of a target CORESET, or reference signals associated with a part of QCL-TypeD of the two TCI states of a target CORESET, or reference signals associated with all QCL-TypeD of the two TCI states of a target CORESET, where the target CORESET is one of the at least one CORESET, or all of the at least one CORESET.

In a case that the BFD RS set includes a first reference signal set and a second reference signal set, it can also be understood that the BFD RS set includes two reference signal sets, and each reference signal set includes at least one TCI state-associated reference signal of the control resource set configuration.

Optionally, the first TCI state is a TCI state corresponding to a port with a lowest index of a Physical downlink control channel Demodulation Reference Signal (PDCCH DMRS), and the second TCI state is a TCI state corresponding to a port with a next lowest index or a highest index of the PDCCH DMRS; where the next lowest index is higher than the lowest index.

The next lowest index is higher than the lowest index, such as: the next lowest index may be higher than the lowest index and adjacent to the lowest index, or the next lowest index may be higher than the lowest index and not adjacent to the lowest index.

Optionally, when the target CORESET is one of the at least one CORESET, the target CORESET is a CORESET with a lowest index in the at least one CORESET, or a CORESET of which a higher-layer parameter value is a specific value in the at least one CORESET (for example, CORESETpoolndex value is 0 or 1), or any one of the at least one target CORESET.

Optionally, the performing the beam failure processing according to the reference signals in the BFD RS set includes:

when the BFD RS includes a first reference signal set and a second reference signal set, reporting a beam failure event to the network device when measured values of all reference signals in the first reference signal set or the second reference signal set are detected to be worse than a first threshold; or when the BFD RS includes a third reference signal set, reporting a beam failure event to the network device when the measured values of all reference signals in the third reference signal set are detected to be worse than a first threshold; or when the BFD RS includes a third reference signal set, reporting a beam failure event to the network device when the measured values of all reference signals associated with one TCI state in the third reference signal set are detected to be worse than a first threshold.

Optionally, the reporting the beam failure event to the network device includes:

reporting a candidate beam corresponding to the first reference signal set to the network device when the measured values of all reference signals in the first reference signal set are detected to be worse than the first threshold; or reporting a candidate beam corresponding to the second reference signal set to the network device when the measured values of all reference signals in the second reference signal set are detected to be worse than the first threshold; or reporting two candidate beams corresponding to the third reference signal set to the network device when the measured values of all reference signals in the third reference signal set are detected to be worse than a first threshold; or when the measured values of all reference signals associated with one TCI state in the third reference signal set are detected to be worse than a first threshold, reporting candidate beams corresponding to a set including all reference signal associated with the one TCI state to the network device; or when the measured values of all reference signals associated with one TCI state in the third reference signal set are detected to be worse than a first threshold, reporting two candidate beams corresponding to the third reference signal set to the network device. In this way, the network device can set a new, more appropriate TCI state for the transmission of the current physical channel, thereby contributing to improved system performance. It should be noted that, being worse than the first threshold may represent being larger than the first threshold or being smaller than the first threshold. Optionally, in the case that the measurement value of the reference signal larger than the first threshold is the measurement value of the demand, being worse than the first threshold may represent being larger than the first threshold; alternatively, in the case that the measurement value of the reference signal being smaller than the first threshold is the measurement value of demand, being worse than the first threshold may represent being smaller than the first threshold. Optionally, in the case that the measurement value of the reference signal being larger than the first threshold is the measurement value of demand, being worse than the first threshold may indicate being smaller than the first threshold; alternatively, in the case that the measurement value of the reference signal being smaller than the first threshold is the measurement value of demand, being worse than the first threshold may represent being larger than the first threshold. The present disclosure does not limit herein. The foregoing embodiment describes a beam failure processing method at a terminal side in the present disclosure, and the following embodiment will further describe a corresponding terminal with reference to the accompanying drawings.

Figure 2:
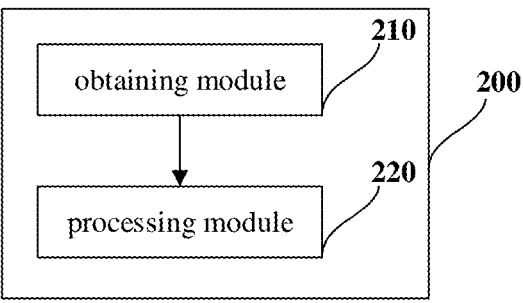
FIG. 2 is a first block diagram of a terminal in an embodiment of the present disclosure.

As shown in FIG. 2, an embodiment of the present disclosure provides a terminal 200, including:

an obtaining module 210, configured to obtain K beam failure recovery (BFR) procedures and a beam failure detection reference signal (BFD RS) set or a control resource set (CORESET) group corresponding to each of the K BFR procedures; where K is a positive integer;

a processing module 220, configured to, for each of the K BFR procedures, perform a beam failure processing according to a reference signal in the BFD RS set corresponding to the BFR procedure or a reference signal associated with the CORESET group corresponding to the BFR procedure;

where the CORESET group includes at least one CORESET.

Optionally, the obtaining module 210 includes at least one of:

a first obtaining submodule, configure to obtain the K BFR procedures configured by a network device for a terminal and one BFD RS set configured by the network device for each of the K BFR procedures;

a second obtaining submodule, configure to obtain the K BFR procedures configured by a network device for a terminal and one CORESET group configured by the network device for each of the K BFR procedures;

a third obtaining submodule, configured to the K BFR procedures configured by a network device for a terminal and determining one CORESET group corresponding to each of the K BFR procedures according to a predefined rule;

a fourth obtaining submodule, configured to obtain K BFD RS sets configured by a network device for a terminal and determine the K BFR procedures and one BFD RS set corresponding to each of the K BFR procedures according to a predefined rule;

a first determining submodule, configured to determine the K BFR procedures and one BFD RS set corresponding to each of the K BFR procedures according to a predefined rule;

a second determining submodule, configured to determine the K BFR procedures and one CORESET group corresponding to each of the K BFR procedures according to a predefined rule.

Optionally, the third obtaining submodule includes:

a first determining subunit, configured to determine one CORESET group corresponding to each of the K BFR procedures according to a number K of the BFR procedures and a higher-layer parameter of the CORESET.

Optionally, the second determination submodule includes at least one of:

a second determining subunit, configured to determine the number K of the BFR procedures as a number of higher-layer parameter values of CORESET;

a third determining subunit, configured to determine the CORESET with a higher-layer parameter value of CORESET being a specific value included in the CORESET group corresponding to one BFR procedure in the K BFR procedures.

Optionally, the reference signal associated with the CORESET group is at least one reference signal in quasi-co-location (QCL) parameters of a CORESET in the CORESET group.

Optionally, the processing module 220 includes:

a reporting submodule, configured to, when measured values of all reference signals corresponding to a first BFR procedure are detected to be worse than a first threshold, report, to a network device, at least one of an index of the first BFR procedure, an index of the reference signal corresponding to the first BFR procedure, an index of the BFD RS set corresponding to the first BFR procedure, an index of the CORESET corresponding to the first BFR procedure, and an index of the CORESET group corresponding to the first BFR procedure;

where the first BFR procedure is any one of the K BFR procedures.

The terminal side embodiment of the present disclosure is corresponding to the above method embodiment, and all implementation means in the above method embodiment are applicable to the terminal embodiment, and the same technical effect can be achieved.

According to the terminal 200 in the embodiment of the present disclosure, when the terminal obtains K BFR procedures and the BFD RS sets or the CORESET groups corresponding to the K BFR procedures, the terminal may, for each BFR procedure, perform a beam failure processing according to a reference signal in the BFD RS set corresponding to the BFR procedure or a reference signal associated with the CORESET group corresponding to the BFR procedure. Therefore, it may be guaranteed that the terminal can report in time when a part of the transmissions fails, thereby solving the issues of poor communication performance in the beam failure transmission method in the related art, and helping to reduce the transmission delay; and when it is not shown that the network device configures BFD RS set, the terminal can determine whether to report the beam failure aiming at partial transmission or aiming at the whole cell according to the configured BFR procedure.

As shown in FIG. 3, an embodiment of the present disclosure further provides a beam failure processing method, which is applied to a terminal, where the method includes:

Step 31: obtaining at least one control resource set (CORESET) configured by a network device, where the CORESET is configured with two transmission configuration indication (TCI) states.

Optionally, the network device may configure a plurality of CORESETs for the terminal, which may include at least one CORESET configured with two TCI states.

Step 32: determining a beam failure detection reference signal (BFD RS) set according to reference signals associated with the TCI states.

Step 33: performing a beam failure processing according to reference signals in the BFD RS set.

In this embodiment, the terminal determines a beam failure detection reference signal (BFD RS) set according to a reference signal associated with a TCI state when obtaining at least one transmission configuration indication TCI state CORESET configured by the network device; and performing beam failure processing according to the reference signal of the BFD RS set, namely performing beam failure processing aiming at each TCI state. Therefore, it may be guaranteed that the terminal can report in time when a part of the transmissions fails, thereby solving the issues of poor communication performance in the beam failure transmission method in the related art, and helping to reduce the transmission delay; and when it is not shown that the network device configures BFD RS set, the terminal can determine whether to report the beam failure aiming at partial transmission or aiming at the whole cell according to the configured BFR procedure.

Optionally, the BFD RS set includes at least one of:

a first reference signal set and a second reference signal set;

a third reference signal set;

where the first reference signal set includes: a reference signal associated with a first TCI state of the two TCI states configured for at least one of the CORESET, or reference signals associated with a part of quasi-co-location D type (QCL-TypeD) of the first TCI state, or reference signals associated with all QCL-TypeD of the first TCI state;

the second reference signal set includes: a reference signal associated with a second TCI state of the two TCI states configured for at least one of the CORESET, or reference signals associated with a part of QCL-TypeD of the second TCI state, or reference signals associated with all QCL-TypeD of the second TCI state;

the third reference signal set includes: reference signals associated with the two TCI states of a target CORESET, or reference signals associated with a part of QCL-TypeD of the two TCI states of a target CORESET, or reference signals associated with all QCL-TypeD of the two TCI states of a target CORESET, where the target CORESET is one of the at least one CORESET, or all of the at least one CORESET.

in a case that the BFD RS set includes a first reference signal set and a second reference signal set, it can also be understood that the BFD RS set includes two reference signal sets, and each reference signal set includes at least one TCI state-associated reference signal of the control resource set configuration.

Optionally, the first TCI state is a TCI state corresponding to a port with a lowest index of a Physical downlink control channel Demodulation Reference Signal (PDCCH DMRS);

the second TCI state is a TCI state corresponding to a port with a next lowest index or a highest index of the PDCCH DMRS; where the next lowest index is higher than the lowest index.

The next lowest index is higher than the lowest index, such as: the next lowest index may be higher than the lowest index and adjacent to the lowest index, or the next lowest index may be higher than the lowest index and not adjacent to the lowest index.

Optionally, when the target CORESET is one of the at least one CORESET, the target CORESET is a CORESET with a lowest index in the at least one CORESET, or a CORESET of which a higher-layer parameter value is a specific value in the at least one CORESET (for example, CORESETpoolIndex value is 0 or 1), or any one of the at least one target CORESET.

Optionally, the performing the beam failure processing according to the reference signals in the BFD RS set includes:

when the BFD RS includes a first reference signal set and a second reference signal set, reporting a beam failure event to the network device when measured values of all reference signals in the first reference signal set or the second reference signal set are detected to be worse than a first threshold; or when the BFD RS includes a third reference signal set, reporting a beam failure event to the network device when the measured values of all reference signals in the third reference signal set are detected to be worse than a first threshold; or when the BFD RS includes a third reference signal set, reporting a beam failure event to the network device when the measured values of all reference signals associated with one TCI state in the third reference signal set are detected to be worse than a first threshold.

Optionally, when reporting the beam failure event to the network device, the terminal may report a new candidate beam corresponding to one TCI state, or report new candidate beams corresponding to two TCI states.

For example: the reporting the beam failure event to the network device includes:

reporting a candidate beam corresponding to the first reference signal set to the network device when the measured values of all reference signals in the first reference signal set are detected to be worse than the first threshold; or reporting a candidate beam corresponding to the second reference signal set to the network device when the measured values of all reference signals in the second reference signal set are detected to be worse than the first threshold; or reporting two candidate beams corresponding to the third reference signal set to the network device when the measured values of all reference signals in the third reference signal set are detected to be worse than a first threshold; or when the measured values of all reference signals associated with one TCI state in the third reference signal set are detected to be worse than a first threshold, reporting candidate beams corresponding to a set including all reference signal associated with the one TCI state to the network device; or when the measured values of all reference signals associated with one TCI state in the third reference signal set are detected to be worse than a first threshold, reporting two candidate beams corresponding to the third reference signal set to the network device. In this way, the network device can set a new, more appropriate TCI state for the transmission of the current physical channel, thereby contributing to improved system performance.

The foregoing embodiment describes another method for processing beam failure at the terminal side in the present disclosure, and the following embodiment will further describe a corresponding terminal with reference to the accompanying drawings.

As shown in FIG. 4, a terminal 400 is provided in an embodiment of the present disclosure, including:

an obtaining module 410, configured to obtain at least one control resource set (CORESET) configured by a network device, where the CORESET is configured with two transmission configuration indication (TCI) states;

a determining module 420, configured to determine a beam failure detection reference signal (BFD RS) set according to reference signals associated with the TCI states;

a processing module 430, configured to perform a beam failure processing according to reference signals in the BFD RS set.

Optionally, the BFD RS set includes at least one of:

a first reference signal set and a second reference signal set;

a third reference signal set;

where the first reference signal set includes: a reference signal associated with a first TCI state of the two TCI states configured for at least one of the CORESET, or reference signals associated with a part of quasi-co-location D type (QCL-TypeD) of the first TCI state, or reference signals associated with all QCL-TypeD of the first TCI state;

the second reference signal set includes: a reference signal associated with a second TCI state of the two TCI states configured for at least one of the CORESET, or reference signals associated with a part of QCL-TypeD of the second TCI state, or reference signals associated with all QCL-TypeD of the second TCI state;

the third reference signal set includes: reference signals associated with the two TCI states of a target CORESET, or reference signals associated with a part of QCL-TypeD of the two TCI states of a target CORESET, or reference signals associated with all QCL-TypeD of the two TCI states of a target CORESET, where the target CORESET is one of the at least one CORESET, or all of the at least one CORESET.

Optionally, the first TCI state is a TCI state corresponding to a port with a lowest index of a Physical downlink control channel Demodulation Reference Signal (PDCCH DMRS);

the second TCI state is a TCI state corresponding to a port with a next lowest index or a highest index of the PDCCH DMRS; where the next lowest index is higher than the lowest index.

Optionally, when the target CORESET is one of the at least one CORESET, the target CORESET is a CORESET with a lowest index in the at least one CORESET, or a CORESET of which a higher-layer parameter value is a specific value in the at least one CORESET, or any one of the at least one target CORESET.

Optionally, the processing module 430 includes:

a first reporting submodule, configured to, when the BFD RS includes a first reference signal set and a second reference signal set, report a beam failure event to the network device when measured values of all reference signals in the first reference signal set or the second reference signal set are detected to be worse than a first threshold; or a second reporting submodule, configured to, when the BFD RS includes a third reference signal set, report a beam failure event to the network device when the measured values of all reference signals in the third reference signal set are detected to be worse than a first threshold; or a third reporting submodule, configured to, when the BFD RS includes a third reference signal set, report a beam failure event to the network device when the measured values of all reference signals associated with one TCI state in the third reference signal set are detected to be worse than a first threshold.

Optionally, the processing module 430 further includes:

a first reporting unit, configured to report a candidate beam corresponding to the first reference signal set to the network device when the measured values of all reference signals in the first reference signal set are detected to be worse than the first threshold; or a second reporting unit, configured to report a candidate beam corresponding to the second reference signal set to the network device when the measured values of all reference signals in the second reference signal set are detected to be worse than the first threshold; or a third reporting unit, configured to report two candidate beams corresponding to the third reference signal set to the network device when the measured values of all reference signals in the third reference signal set are detected to be worse than a first threshold; or a fourth reporting unit, configured to, when the measured values of all reference signals associated with one TCI state in the third reference signal set are detected to be worse than a first threshold, report candidate beams corresponding to a set including all reference signal associated with the one TCI state to the network device; or a fifth reporting unit, configured to, when the measured values of all reference signals associated with one TCI state in the third reference signal set are detected to be worse than a first threshold, report two candidate beams corresponding to the third reference signal set to the network device.

The terminal side embodiment of the present disclosure is corresponding to the above method embodiment, and all implementation means in the above method embodiment are applicable to the terminal embodiment, and the same technical effect can be achieved.

In the terminal 400 in the embodiment of the present disclosure, when at least one configured two transmission configuration indicators configured by a network device is obtained to indicate a TCI state, a beam failure detection reference signal (BFD RS) set is determined according to a reference signal associated with the TCI state; and performing beam failure processing according to the reference signal of the BED RS set, namely performing beam failure processing aiming at each TCI state. Therefore, it may be guaranteed that the terminal can report in time when a part of the transmissions fails, thereby solving the issues of poor communication performance in the beam failure transmission method in the related art, and helping to reduce the transmission delay; and when it is not shown that the network device configures BFD RS set, the terminal can determine whether to report the beam failure aiming at partial transmission or aiming at the whole cell according to the configured BFR procedure.

Figure 5:
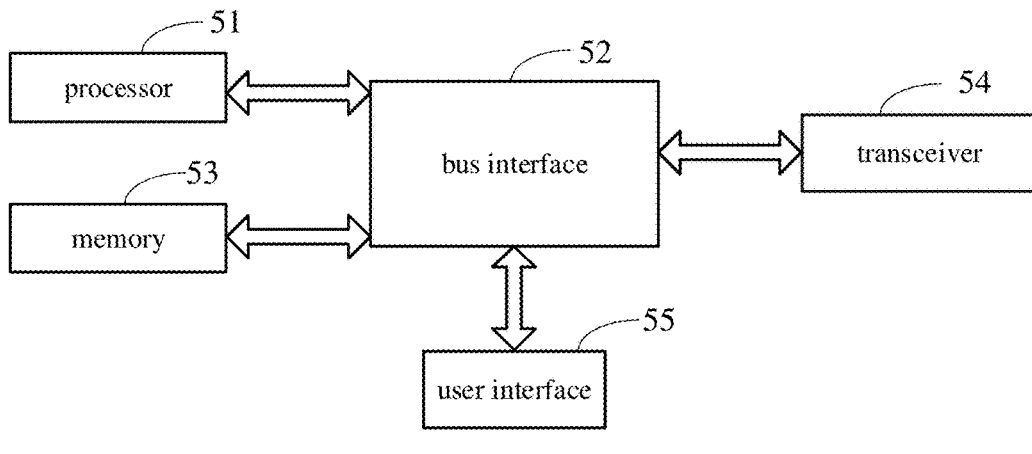
FIG. 5 is a third block diagram of a terminal in an embodiment of the present disclosure.

As shown in FIG. 5, a terminal is provide in an embodiment of the present disclosure, including: a processor 51, and a memory 53 connected to the processor 51 through a bus interface 52, where the memory 53 is used for storing programs and data used by the processor 51 in executing operations, and when the processor 51 calls and executes the programs and data stored in the memory 53, the following processes are executed.

the processor 51 executes the program to perform:

obtaining K beam failure recovery (BFR) procedures and a beam failure detection reference signal (BFD RS) set or a control resource set (CORESET) group corresponding to each of the K BFR procedures; where K is a positive integer;

for each of the K BFR procedures, performing a beam failure processing according to a reference signal in the BFD RS set corresponding to the BFR procedure or a reference signal associated with the CORESET group corresponding to the BFR procedure;

where the CORESET group includes at least one CORESET.

Optionally, the processor 51 executes the program to perform at least one of:

obtaining the K BFR procedures configured by a network device for a terminal and one BFD RS set configured by the network device for each of the K BFR procedures;

obtaining the K BFR procedures configured by a network device for a terminal and one CORESET group configured by the network device for each of the K BFR procedures;

obtaining the K BFR procedures configured by a network device for a terminal and determining, by the terminal, one CORESET group corresponding to each of the K BFR procedures according to a predefined rule;

obtaining K BFD RS sets configured by a network device for a terminal and determining, by the terminal, the K BFR procedures and one BFD RS set corresponding to each of the K BFR procedures according to a predefined rule;

determining, by a terminal, the K BFR procedures and one BFD RS set corresponding to each of the K BFR procedures according to a predefined rule; and determining, by a terminal, the K BFR procedures and one CORESET group corresponding to each of the K BFR procedures according to a predefined rule.

Optionally, the processor 51 executes the program to perform:

determining one CORESET group corresponding to each of the K BFR procedures according to a number K of the BFR procedures and a higher-layer parameter of the CORESET.

Optionally, the processor 51 executes the program to perform at least one of:

determining the number K of the BFR procedures as a number of higher-layer parameter values of CORESET; and determining the CORESET with a higher-layer parameter value of CORESET being a specific value included in the CORESET group corresponding to one BFR procedure in the K BFR procedures.

Optionally, the reference signal associated with the CORESET group is at least one reference signal in quasi-co-location (QCL) parameters of a CORESET in the CORESET group.

Optionally, the processor 51 executes the program to perform:

when measured values of all reference signals corresponding to a first BFR procedure are detected to be worse than a first threshold, reporting, to a network device, at least one of an index of the first BFR procedure, an index of the reference signal corresponding to the first BFR procedure, an index of the BFD RS set corresponding to the first BFR procedure, an index of the CORESET corresponding to the first BFR procedure, and an index of the CORESET group corresponding to the first BFR procedure;

where the first BFR procedure is any one of the K BFR procedures.

And/or, when the processor 51 calls and executes the programs and data stored in the memory 53, the following processes are performed.

Optionally, the processor 51 executes the program to perform:

obtaining at least one control resource set (CORESET) configured by a network device, where the CORESET is configured with two transmission configuration indication (TCI) states;

determining a beam failure detection reference signal (BFD RS) set according to reference signals associated with the TCI states; and performing a beam failure processing according to reference signals in the BFD RS set.

Optionally, the BFD RS set includes at least one of:

a first reference signal set and a second reference signal set;

a third reference signal set;

where the first reference signal set includes: a reference signal associated with a first TCI state of the two TCI states configured for at least one of the CORESET, or reference signals associated with a part of quasi-colocation D type (QCL-TypeD) of the first TCI state, or reference signals associated with all QCL-TypeD of the first TCI state;

the second reference signal set includes: a reference signal associated with a second TCI state of the two TCI states configured for at least one of the CORESET, or reference signals associated with a part of QCL-TypeD of the second TCI state, or reference signals associated with all QCL-TypeD of the second TCI state;

the third reference signal set includes: reference signals associated with the two TCI states of a target CORESET, or reference signals associated with a part of QCL-TypeD of the two TCI states of a target CORESET, or reference signals associated with all QCL-TypeD of the two TCI states of a target CORESET, where the target CORESET is one of the at least one CORESET, or all of the at least one CORESET.

Optionally, the first TCI state is a TCI state corresponding to a port with a lowest index of a Physical downlink control channel Demodulation Reference Signal (PDCCH DMRS);

the second TCI state is a TCI state corresponding to a port with a next lowest index or a highest index of the PDCCH DMRS; where the next lowest index is higher than the lowest index.

Optionally, when the target CORESET is one of the at least one CORESET, the target CORESET is a CORESET with a lowest index in the at least one CORESET, or a CORESET of which a higher-layer parameter value is a specific value in the at least one CORESET, or any one of the at least one target CORESET.

Optionally, the processor 51 executes the program to perform:

when the BFD RS includes a first reference signal set and a second reference signal set, reporting a beam failure event to the network device when measured values of all reference signals in the first reference signal set or the second reference signal set are detected to be worse than a first threshold; or when the BFD RS includes a third reference signal set, reporting a beam failure event to the network device when the measured values of all reference signals in the third reference signal set are detected to be worse than a first threshold; or when the BFD RS includes a third reference signal set, reporting a beam failure event to the network device when the measured values of all reference signals associated with one TCI state in the third reference signal set are detected to be worse than a first threshold.

Optionally, the processor 51 executes the program to perform:

reporting a candidate beam corresponding to the first reference signal set to the network device when the measured values of all reference signals in the first reference signal set are detected to be worse than the first threshold; or reporting a candidate beam corresponding to the second reference signal set to the network device when the measured values of all reference signals in the second reference signal set are detected to be worse than the first threshold; or reporting two candidate beams corresponding to the third reference signal set to the network device when the measured values of all reference signals in the third reference signal set are detected to be worse than a first threshold; or when the measured values of all reference signals associated with one TCI state in the third reference signal set are detected to be worse than a first threshold, reporting candidate beams corresponding to a set including all reference signal associated with the one TCI state to the network device; or when the measured values of all reference signals associated with one TCI state in the third reference signal set are detected to be worse than a first threshold, reporting two candidate beams corresponding to the third reference signal set to the network device.

A transceiver 54 is connected to the bus interface 52 for receiving and transmitting data under control of the processor 51.

It should be noted that in FIG. 5, the bus architecture may include any number of interconnected buses and bridges, with one or more processors represented by processor 51 and various circuits represented by memory 53 being linked together. The bus architecture may also link together various other circuits such as peripherals, voltage regulators, power management circuits, and the like, which are well known in the art, and therefore, will not be described any further herein. The bus interface provides an interface. The transceiver 54 may be a plurality of elements, including a transmitter and a transceiver, providing a means for communicating with various other apparatus over a transmission medium. For different terminals, the user interface 55 may also be an interface capable of interfacing with a desired device, including but not limited to a keypad, display, speaker, microphone, joystick, etc. The processor 51 is responsible for managing the bus architecture and general processing, and the memory 53 may store data used by the processor 51 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

The embodiments of the present disclosure further provide a readable storage medium, where a program or an instruction is stored, and when the program or the instruction is executed by a processor, the program or the instruction implements each process of the foregoing beam failure processing method embodiment, and can achieve the same technical effect, and in order to avoid repetition, details are not repeated here.

The processor is the processor in the electronic device described in the above embodiment. The readable storage medium includes a computer-readable storage medium, such as a Read-Only Memory (ROM), a Random Access Memory (RAM), a magnetic disk or an optical disk, and so on.

The beam failure processing method according to the embodiment of the present disclosure is introduced from the terminal side, and the beam failure processing method at the network device side will be further described below with reference to the drawings.

Figure 6:
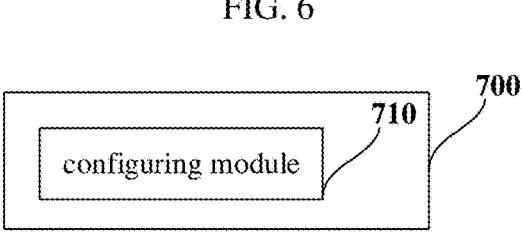
FIG. 6 is a flow chart of a beam failure processing method at a network device side in an embodiment of the present disclosure.

As shown in FIG. 6, a beam failure processing method is provided in an embodiment of the present disclosure provides, which is applied to a network device, and the method includes:

Step 61: configuring K beam failure recovery (BFR) procedures for a terminal, and/or configuring a beam failure detection reference signal (BFD RS) set or a control resource set (CORESET) group corresponding to each of the K BFR procedures for a terminal;

wherein the BFD RS set or the CORESET group is configured to instruct the terminal to perform a beam failure processing for each of the K BFR procedures; the CORESET group includes at least one CORESET, and K is a positive integer.

Optionally, the configuring the K BFR procedures for the terminal and/or configuring the BFD RS set or the CORESET group corresponding to each of the K BFR procedures for the terminal includes at least one of:

configuring the K BFR procedures and configuring one BFD RS set for each of the K BFR procedures, for the terminal;

configuring the K BFR procedures and configuring one CORESET group for each of the K BFR procedures, for the terminal;

configuring the K BFR procedures for the terminal;

configuring K BFD RS sets for the terminal; and configuring K CORESET groups for the terminal.

In this embodiment, K BFR procedures and a BFD RS set or a CORESET corresponding to each BFR procedure are directly configured by the network device, or the network device configures K BFR procedures for the terminal, so that the terminal may determine the BFD RS set or the CORESET corresponding to each BFR procedure according to a predefined rule; or the network device configures K BFD RS sets or K CORESET groups for the terminal, so that the network device can determine the number of BFR procedures and the BFD RS set or the CORESET group corresponding to each BFR procedure according to a predefined rule. Therefore, the terminal can perform beam failure processing according to the reference signal associated with the BFD RS set or the CORESET group corresponding to each BFR procedure. Therefore, it may be guaranteed that the terminal can report in time when a part of the transmissions fails, thereby solving the issues of poor communication performance in the beam failure transmission method in the related art, and helping to reduce the transmission delay; and when it is not shown that the network device configures BFD RS set, the terminal can determine whether to report the beam failure aiming at partial transmission or aiming at the whole cell according to the configured BFR procedure.

Specifically, in the embodiment of the present disclosure, a manner in which the network device configures K BFR procedures for the terminal, and/or configures a BFD RS set or a CORESET corresponding to the K BFR procedures for the terminal, and the terminal determines the BFD RS set or the CORESET corresponding to each BFR procedure according to a predefined rule may be referred to the above embodiment of the terminal side, and is not described herein again to avoid repetition.

The foregoing embodiment describes a beam failure processing method at the network device side of the present disclosure, and the following embodiment will further describe a network device corresponding to the foregoing embodiment with reference to the accompanying drawings.

As shown in FIG. 7, a network device 700 is provided in an embodiment of the present disclosure, including:

a configuring module 710, configured to configure K beam failure recovery (BFR) procedures for a terminal, and/or configuring a beam failure detection reference signal (BFD RS) set or a control resource set (CORESET) group corresponding to each of the K BFR procedures for a terminal;

where the BFD RS set or the CORESET group is configured to instruct the terminal to perform a beam failure processing for each of the K BFR procedures; the CORESET group includes at least one CORESET, and K is a positive integer.

Optionally, the configuration module 710 includes at least one of:

a first configuring submodule, configured to configure the K BFR procedures and configuring one BFD RS set for each of the K BFR procedures, for the terminal;

a second configuring submodule, configured to configure the K BFR procedures and configuring one CORESET group for each of the K BFR procedures, for the terminal;

a third configuring submodule, configured to configure the K BFR procedures for the terminal;

a fourth configuring submodule, configured to configure K BFD RS sets for the terminal; and a fifth configuring submodule, configured to configure K CORESET groups for the terminal.

The network device side embodiment of the present disclosure is corresponding to the embodiment of the method, and all implementation means in the method embodiment are applicable to the embodiment of the network device, and the same technical effect can be achieved.

The network device 700 of this embodiment may directly configure K BFR procedures and a BFD RS set or a CORESET corresponding to each BFR procedure for the terminal, or configure K BFR procedures for the terminal, so that the terminal may determine the BFD RS set or the CORESET corresponding to each BFR procedure according to a predefined rule; or configuring K BFD RS sets or K CORESET groups for the terminal, so that the network device can determine the number of BFR procedures and the BFD RS set or the CORESET group corresponding to each BFR procedure according to a predefined rule. Therefore, the terminal can perform beam failure processing according to the reference signal associated with the BFD RS set or the CORESET group corresponding to each BFR procedure. Therefore, it may be guaranteed that the terminal can report in time when a part of the transmissions fails, thereby solving the issues of poor communication performance in the beam failure transmission method in the related art, and helping to reduce the transmission delay; and when it is not shown that the network device configures BFD RS set, the terminal can determine whether to report the beam failure aiming at partial transmission or aiming at the whole cell according to the configured BFR procedure.

Figure 8:
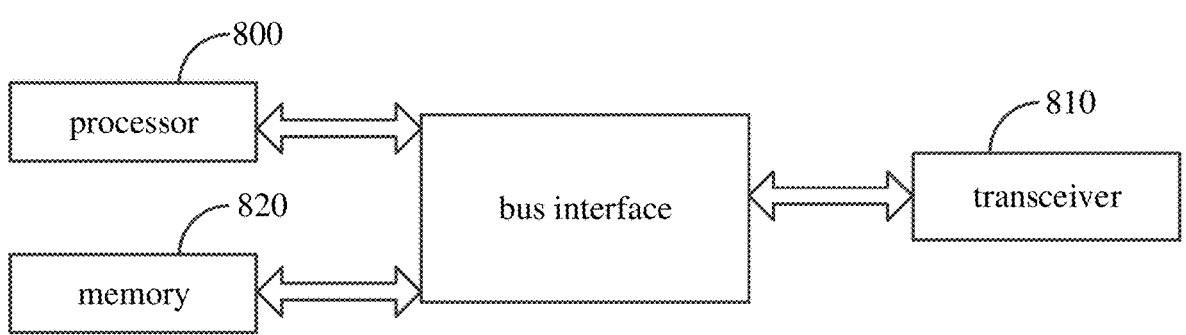
FIG. 8 is a second block diagram of a network device in an embodiment of the present disclosure.

To better achieve the above object, as shown in FIG. 8, a fourth embodiment of the present disclosure further provides a network device, including: a processor 800; a memory 820 connected to the processor 800 through a bus interface, and a transceiver 810 connected to the processor 800 through a bus interface; the memory 820 is used for storing programs and data used by the processor in performing operations; transmitting data information or pilot through the transceiver 810, and also receiving an uplink control channel through the transceiver 810; when the processor 800 calls and executes the programs and data stored in the memory 820, the following functions are implemented.

Optionally, the processor 800 implements the following steps when executing the program:

configuring K beam failure recovery (BFR) procedures for a terminal, and/or configuring a beam failure detection reference signal (BFD RS) set or a control resource set (CORESET) group corresponding to each of the K BFR procedures for a terminal;

the BFD RS set or the CORESET group is configured to instruct the terminal to perform a beam failure processing for each of the K BFR procedures; the CORESET group includes at least one CORESET, and K is a positive integer.

Optionally, the processor 800, when executing the program, performs at least one of the following steps:

configuring the K BFR procedures and configuring one BFD RS set for each of the K BFR procedures, for the terminal;

configuring the K BFR procedures and configuring one CORESET group for each of the K BFR procedures, for the terminal;

configuring the K BFR procedures for the terminal;

configuring K BFD RS sets for the terminal; and configuring K CORESET groups for the terminal.

The transceiver 810 is used to receive and transmit data under the control of the processor 800.

In FIG. 8 the bus architecture may include any number of interconnected buses and bridges, with one or more processors represented by processor 800 and various circuits of memory represented by memory 820 being linked together. The bus architecture may also link together various other circuits such as peripherals, voltage regulators, power management circuits, and the like, which are well known in the art, and therefore, will not be described any further herein. The bus interface provides an interface. The transceiver 810 may be a number of elements, including a transmitter and a transceiver, providing a means for communicating with various other apparatus over a transmission medium. The processor 800 is responsible for managing the bus architecture and general processing, and the memory 820 may store data used by the processor 800 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

The embodiments of the present disclosure further provide a readable storage medium, where a program or an instruction is stored, and when the program or the instruction is executed by a processor, the program or the instruction implements each process of the foregoing beam failure processing method embodiment, and can achieve the same technical effect, and in order to avoid repetition, details are not repeated here.

The processor is the processor in the electronic device described in the above embodiment. The readable storage medium includes a computer-readable storage medium, such as a Read-Only Memory (ROM), a Random Access Memory (RAM), a magnetic disk or an optical disk, and so on.

The following describes a method for processing beam failure at a terminal side and a network device side according to the present disclosure with reference to specific embodiments:

Example 1 the network device explicitly configures the BFR procedures, as well as the BFD RS set that each BFR includes.

The network device explicitly configures K BFR procedures (or K BFR procedures for all bandwidth parts as well) for each bandwidth part of each serving cell of the terminal, each BFR procedure includes one BFD RS set. Each BFR procedure can correspond to the transmission of one TRP or a plurality of TRPs or the transmission of the whole cell; K is a positive integer.

For example: all BFR procedures on a serving cell are configured by a BFR procedure list related parameter, such as a beam failure recovery procedure list (BeamFailureRecoveryProcedureList), where the list includes a plurality of BFR procedures, each BFR procedure is configured by a higher layer parameter, such as a beam failure recovery procedure (BeamFailureRecoveryProcedure) parameter, each BFR procedure includes a BFD RS set, such as q0, and the corresponding higher layer parameter is a failure detection resource (failure detection Resources). In addition, each BFR procedure and/or each BFD RS set may include an index configuration, such as a beam failure recovery procedure identifier (BeamFailureRecoveryProcedureId) or a failure detection resource identifier (failureDetectionResourcesId), so that the network device side may determine which BFR procedure or BFD RS has a beam failure event according to the report of the terminal, and further change a serving beam for the TRP or cell having a beam failure.

Optionally, the index configuration is such that,
BeamFaiilureRecoverypProcedure: : = SEQUENCE {
BeamFailureRecoveryProcedureId          BeamFailureRecoveryProcedureId,
...

-continued

```
}
or
BeamFaiilureRecoverypProcedure: : = SEQUENCE {
failureDetectionResourcesId        failureDetectionResourcesId
...
}
or
BeamFaiilureRecoveryProcedure: : = SEQUENCE {
BeamFailureRecoveryProcedureId      BeamFailureRecoveryProcedureId,
failureDetectionResourcesId        failureDetectionResourcesId
...
}
```

When the terminal detects that all BFD RSs correspond- ing to any one of the BFR procedures are lower than a certain threshold, the BFR procedure index or the BFD RS set index is reported to the base station, and after receiving the report of the terminal, the network device side changes serving beams for TRP or cells corresponding to the reported BFR procedure or the BFD RS set so as to recover normal transmission.

Example 2 the network device explicitly configures the BFR procedures and the CORESET group corresponding to each BFR procedure, where one CORESET group includes at least one CORESET.

The network device explicitly configures K BFR procedures (or K BFR procedures for all bandwidth parts) for each bandwidth part of each serving cell of the terminal, and each BFR procedure configures one CORESET, as may be represented by a higher-layer parameter control resource set list (controlResourceSetList); where K is a positive integer.

The CORESET group includes: a CORESET corresponding to one or more CORESET indexes configured by the network device, or a CORESET of which a higher-layer parameter is configured to be a specific value, for example, the higher-layer parameter may be a control resource aggregation pool index (CORESETpoolIndex).

The specific signaling may be as follows,

```
BeamFailureRecoveryProcedure: : = SEQUENCE {
...
controlResourceSetlist SEQUENCE (SIZE (1..L)) OF
ControlResourceSetId
...
}
``` where L is the CORESET number configured in the BFR procedure.

For example: the network device configures that BFR procedure 1 includes CORESETs 1, 3 and 5; BFR procedure 2 includes CORESETs 2 and 4; in addition, BFR procedure 3 may be configured to include all of the above CORESETs (i.e., CORESETs 1-5), corresponding to the BFR procedure of the cell.

The specific signaling may also be:

```
BeamFaiilureRecoveryProcedure: : = SEQUENCE {
...
coresetPoolIndex-r16            INTEGER (0..1)
...
}
or
```

-continued

```
BeamFaiilureRecoveryProcedure: : = SEQUENCE {
...
coresetPoolIndexList            SEQUENCE (SIZE (1.. 2)) OF
                               coresetPoolIndex-r16
...
}
```

Another example is: the network device may explicitly configure that a BFR procedure 1 includes a CORESET with a CORESETpoolIndex value of 0 or without a CORESETpoolIndex parameter, a BFR procedure 2 includes a CORESET with a CORESETpoolIndex value of 1, and a BFR procedure 3 includes CORESETs with CORESETpoolIndex values of 0 and 1 on the BWP (i.e., all CORESETs).

Optionally, in this embodiment, the controlResourceSetId or CORESETpoolIndex is configured to each BFR procedure by means of network device configuration.

When the terminal detects that all the RSs associated with the CORESET group corresponding to any one of the BFR procedures are lower than a certain threshold, the terminal reports the BFR procedure index, or the CORESET group index or the BFD RS set index to the network device, the CORESET group index may be defined as: CORESETpoolIndex value or CORESET ID, etc.

Optionally, the RS associated with the CORESET group may be an RS associated with the TCI state of CORESET included in the CORESET group, or an RS QCL associated with the TCI state of CORESET.

Example 3 the network device explicitly configures the quantity of BFR procedures, and the terminal determines a corresponding CORESET group for the BFR procedures in a predefined mode.

The network device explicitly configures K BFR procedures (or K BFR procedures for all bandwidth parts) for each bandwidth part of each serving cell of the terminal, that is, only the number of BFR procedures is configured, where K is a positive integer; the terminal determines a CORESET for each BFR procedure through a predefined rule.

When the terminal detects that the RS associated with the CORESET group corresponding to any one of the BFR procedures is lower than a certain specific threshold, the terminal reports the BFR procedure index, or the CORESET group index or the BFD RS set index to the network device.

Optionally, the predefined rule include, but are not limited to, the following:

when each bandwidth part is explicitly configured with 1 BFR procedure, predefining in the specification that BFR procedure 1 includes CORESETpoolIndex value of 0 or CORESET not configured with CORESET-poolIndex parameter; or the BFR procedure 1 includes CORESET with CORESETpoolIndex value of 1, or the BFR procedure 1 includes CORESET with CORESET-poolIndex value of 0, CORESET with CORESETpoolIndex value of 1, and CORESET without CORESET-poolIndex parameter (i.e., all CORESETs).

when each bandwidth part is explicitly configured with 2 BFR procedures, predefining in the specification that BFR procedure 1 includes a CORESET with a CORE-SETpoolIndex value of 0 or without a CORESETpoolIndex parameter, and BFR procedure 2 includes a CORE-SET with a CORESETpoolIndex value of 1.

when each bandwidth part is explicitly configured with 3 BFR procedures, predefining d in the specification that BFR procedure 1 includes a CORESET with a CORE-SETpoolIndex value of 0 or without a CORESETpoolIndex parameter, BFR procedure 2 includes a CORESET with a CORESETpoolIndex value of 1, and process 3 includes all CORESETs on the bandwidth part where the CORESETpoolIndex value is set.

It should be noted that the above predefined rule is only an illustrative example, and the correspondence between the BFR procedure index and the CORESETpoolIndex value may not be limited to several combinations in the above examples.

Example 4 through a predefined rule, the terminal determines K BFR procedures, and/or a CORESET group or a BFD RS set corresponding to each BFR procedure.

The terminal determines, according to a predefined rule, the BFR procedure number of each bandwidth part of each serving cell, or the subset of CORESET or BFD RS set included in each BFR procedure.

For example: when the CORESET configured for the terminal by the network device includes two different CORESETpoolIndex values (e.g., the values are 0 and 1), the terminal determines that the BFR procedure number on the bandwidth part is 2; the BFR procedure 1 includes CORESET with CORESETpoolIndex value of 0 or without CORESETpoolIndex parameter configuration, and the BFR procedure 2 includes CORESET with CORESETpoolIndex value of 1.

Another example is: when the CORESET configured for the terminal by the network device includes two different CORESETpoolIndex values (if the values are 0 and 1), the terminal determines that the BFR procedure number on the bandwidth part is 3; the BFR procedure 1 includes CORE-SET with CORESETpoolIndex value of 0 or without CORESETpoolIndex parameter configuration, the BFR procedure 2 includes CORESET with CORESETpoolIndex value of 1, and the procedure 3 includes all CORESET on the bandwidth part.

Another example is: when the CORESET configured for the terminal by the network device includes a CORESET-poolIndex value (for example, the value is 0 or 1), or all the CORESETs are not configured with a CORESETpoolIndex parameter, the terminal determines that the BFR procedure number on the bandwidth part is 1, and the BFR procedure 1 includes all the CORESETs.

Another example is: when the network device explicitly configures K BFD RS sets (on a bandwidth part of a cell) for the terminal, the terminal determines that the number of BFR procedures on the bandwidth part is K, and each BFR procedure includes one BFD RS set.

Optionally, after the terminal determines the CORESET or CORESET included in the BFR procedure, if the terminal does not explicitly configure a BFD RS set, the terminal may determine that the BFD RS set corresponding to each BFR procedure is: a group of CORESET in a BFR procedure or a reference signal associated with the TCI state of CORE-SET.

When the terminal detects that all the RSs associated with the CORESET group or the BFD RS set corresponding to any one of the BFR procedures are lower than a certain threshold, the BFR procedure index, or the CORESET group index or the BFD RS set index is reported to the network device.

Example 5 after determining K BFR procedures, the terminal performs a beam failure recovery mechanism for one or more BFR procedures, which may be the same as the cell level mechanism in the related art in one BFR procedure. For example: the terminal reports a new candidate beam according to each BFR procedure or CORESET group or BFD RS set, when detecting that the the RSs associated with a certain BFR procedure are all lower than a certain threshold, the terminal reports a BFR procedure index, or CORESET group index or BFD RS set index to the network device, and the network device updates a new serving beam (TCI state) according to a physical channel (such as PDCCH, PDSCH and the like) associated with the BFR procedure reported by the terminal, so that the associated physical channel recovers normal communication.

Example 6 in the NR system, in order to improve transmission reliability of a control channel, the same PDCCH can be transmitted by multiple TRPs to a terminal using different TCI states (beams). For example: one CORESET transmitting PDCCH includes two or more TCI states (i.e., transmitted by two or more transmission reception points), each TCI state being associated with one transmission reception point. In this way, the terminal can obtain control information accurately as long as it can decode the PDCCH transmitted by any transmission reception point.

However, in the related art protocol, there has been no explicit support for the case where one CORESET has two or more TCI states. For example: in the beam failure recovery mechanism in the related art, if the network device does not configure the terminal with the BFD RS set q0, the terminal may determine by itself that at most two CSI-RS resource configurations of the plurality of periodic CSI-RS resource configurations associated with the TCI state of CORESET are included in q 0. If one CORESET includes two or more TCI states, at most two CSI-RS resource configurations determined by the terminal may be associated with the same transmission reception point or different transmission reception points, but the base station cannot know the association relationship between q0 and the transmission reception point, which may result in that the base station cannot know which transmission reception point the new candidate beam reported by the terminal is, and further may replace a serving beam (TCI state) suitable for other transmission reception points for a transmission reception point in normal transmission, resulting in a beam failure occurring at multiple transmission reception points. Therefore, when one CORESET includes TCI states associated with two or more transmission reception points, the beam failure recovery mechanism needs to be enhanced accordingly, so that the network device and the terminal have common understanding on the transmission reception point where the beam failure occurs, thereby ensuring that the base station timely replaces a new serving beam recommended by the terminal for the transmission reception point where the beam failure occurs.

When at least one CORESET includes two or more TCI states, the terminal determines the BFD RS set and/or the reporting behavior of the terminal according to at least one of the following methods:

Method 1: the terminal determines that the BFD RS set includes: the reference signals associated with the two TCI states of one CORESET, or the QCL-TypeD reference signals, or all of the QCL-TypeD reference signals, i.e., the TCI states of the reference signals included in the BFD RS set are specified in a predefined manner.

The corresponding terminal reporting behavior is as follows: and when the measurement values of all the reference signals in the BFD RS set are lower than a certain threshold, the terminal reports a beam failure event. This beam failure event corresponds to the occurrence of a beam failure for both TRP transmissions.

Method 2: the terminal determining that the BFD RS set includes: the reference signals associated with the two TCI states of one CORESET, or the QCL-TypeD reference signals, or all of the QCL-TypeD reference signals, i.e., the TCI states of the reference signals included in the BFD RS set are specified in a predefined manner.

The corresponding terminal reporting behavior is as follows: when the measurement values of the reference signals associated with one TCI state in the BFD RS set are all lower than a certain threshold, the terminal reports a beam failure event. The beam failure event corresponds to the occurrence of a beam failure for the transmission of one of the TRPs.

For the above Method 1 and Method 2, the determination methods of the BFD RS sets are the same, and the reporting behaviors of the two terminals are different.

For the Method 1 and the Method 2, if one bandwidth part is configured with more than one CORESET, the CORESET is: one of the CORESETs including two TCI states (e.g., the CORESET with the lowest index or the CORESET with higher-layer parameter CORESETPoolIndex taking a value of 0 or 1, or either CORESET); or, the CORESET is: all CORESET including two TCI states (in which case the BFD RS set may include two or more reference signals with different TCI states).

Method 3: the terminal determines two BFD RS set, each BFD RS set including reference signals associated with one TCI state of CORESET.

The corresponding terminal reporting behavior is as follows: when the measurement values of all the reference signals in any one set are lower than a certain threshold, the terminal reports a beam failure event. The beam failure event corresponds to the occurrence of a beam failure for the transmission of one of the TRPs.

For Method 3, when one bandwidth part is configured with more than one CORESET, the first BFD RS set corresponds to the first TCI state of one or more CORESETs or PDCCH DMRS port with the lowest index, and the second BFD RS set corresponds to the second TCI state of one or more CORESETs or PDCCH DMRS port with the next lower index or highest index, where the next lowest index is higher than the lowest index, such as: the next lowest index may be higher than the lowest index and adjacent to the lowest index, or the next lowest index may be higher than the lowest index and not adjacent to the lowest index.

Method 4: when at least one CORESET includes two or more TCI states, the terminal does not expect the network device not to explicitly configure the BFD RS set, or the terminal expects the network device to always explicitly configure the BFD RS set.

Optionally, in relation to the above modes 1, 2 and 3, in a case that the network device does not explicitly configure the BFD RS set, after the terminal determines the BFD RS set, a corresponding BFR procedure may be determined according to the mode in example 4. That is, the BFD RS determination method in this embodiment may also be applied in the BFR procedure.

Example 7 a CORESET including two or more TCI states (one for each transmission of a TRP) may include two cases: one is that the same time-frequency resource (e.g. one search space set) within one CORESET uses two or more TCI states, and another is that different time-frequency resources (e.g. two different search space sets) within one CORESET use two or more TCI states, i.e. one TCI state per search space set.

In any case, it may happen that a transmission corresponding to one TCI state of CORESET fails, while a transmission corresponding to another TCI state doesn't fail, or that transmissions corresponding to both TCI states fail. In the embodiment of the application, the terminal can support the reporting of various failure events and/or corresponding new candidate beams.

For example: according to the Method 2 and the Method 3 in the example 6, when the terminal detects that a transmission (i.e., one TRP) corresponding to one TCI state fails, the terminal reports a a new candidate beam corresponding to a failed BFD RS or a failed BFD RS set.

Another example is: according to the method 1 in example 6, when the terminal detects that the transmission corresponding to two TCI states (i.e., two or more TRPs) fails, the terminal reports two new candidate beams corresponding to the failed BFD RS set; where each candidate beam is associated with one TCI state or one TRP.

When the network device receives two new candidate beams reported by the terminal, the first TCI state of the corresponding CORESET is set as a first new candidate beam, and the second TCI state of the CORESET is set as a second new candidate beam.

Another example is: according to the method 2 in example 6, one BFD RS set includes RSs associated with two TCI states, and no matter there is a failure in transmission corresponding to only one TCI state (i.e., 1 TRP) or a failure in transmission corresponding to two TCI states (i.e., two or more TRPs), the terminal always reports two new candidate beams, so that the network device can set new more suitable TCI states for transmission of the current physical channel, which is helpful to improve system performance.

Further, it is noted that in the apparatus and method of the present disclosure, it is apparent that each component or each step may be decomposed and/or recombined. Such decomposition and/or recombination should be considered as equivalents of the present disclosure. Also, the steps of performing the series of processes described above may naturally be performed chronologically in the order described, but need not necessarily be performed chronologically, and some steps may be performed in parallel or independently of each other. It will be understood by those of ordinary skill in the art that all or any of the steps or elements of the methods and apparatus of the present disclosure may be implemented in any computing device (including processors, storage media, etc.) or network of computing devices, in hardware, firmware, software, or any combination thereof, which may be implemented by those of ordinary skill in the art using their basic programming skills after reading the description of the present disclosure.

Thus, the objects of the present disclosure may also be achieved by running a program or a set of programs on any computing device. The computing device may be a well-known general purpose device. Thus, the objects of the present disclosure can also be achieved merely by providing a program product containing program code for implementing the method or apparatus. That is, such a program product also constitutes the present disclosure, and a storage medium storing such a program product also constitutes the present disclosure. It is to be understood that such storage media can be any known storage media or any storage media developed in the future. It is also noted that in the apparatus and methods of the present disclosure, it is apparent that the components or steps may be broken down and/or re-combined. Such decomposition and/or recombination should be considered as equivalents of the present disclosure. Also, the steps of executing the series of processes described above may naturally be executed chronologically in the order described, but need not necessarily be executed chronologically. Some steps may be performed in parallel or independently of each other.

While the foregoing is directed to alternative embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. A beam failure processing method, comprising:
obtaining K beam failure recovery (BFR) procedures and a beam failure detection reference signal (BFD RS) set or a control resource set (CORESET) group corresponding to each of the K BFR procedures; wherein K is a positive integer;
for each of the K BFR procedures, performing a beam failure processing according to a reference signal in the BFD RS set corresponding to the BFR procedure or a reference signal associated with the CORESET group corresponding to the BFR procedure;
wherein the CORESET group comprises at least one CORESET;
wherein the obtaining the K BFR procedures and the BFD RS set or the CORESET group corresponding to each of the K BFR procedures comprises at least one of:
obtaining the K BFR procedures configured by a network device for a terminal and determining, by the terminal, one CORESET group corresponding to each of the K BFR procedures according to a predefined rule; or
determining, by a terminal, the K BFR procedures and one CORESET group corresponding to each of the K BFR procedures according to a predefined rule;
wherein the determining by the terminal one CORESET group corresponding to each of the K BFR procedures according to the predefined rule comprises at least one of:

determining one CORESET group corresponding to each of the K BFR procedures according to a number K of the BFR procedures and a higher-layer parameter of the CORESET;
or
determining the number K of the BFR procedures as a number of higher-layer parameter values of CORESET;
or
determining the CORESET with a higher-layer parameter value of CORESET being a specific value included in the CORESET group corresponding to one BFR procedure in the K BFR procedures.

2. The method according to claim 1, wherein the obtaining the K BFR procedures and the BFD RS set or the CORESET group corresponding to each of the K BFR procedures further comprises at least one of:
obtaining the K BFR procedures configured by a network device for a terminal and one BFD RS set configured by the network device for each of the K BFR procedures;
obtaining the K BFR procedures configured by a network device for a terminal and one CORESET group configured by the network device for each of the K BFR procedures;
obtaining K BFD RS sets configured by a network device for a terminal and determining, by the terminal, the K BFR procedures and one BFD RS set corresponding to each of the K BFR procedures according to a predefined rule; or
determining, by a terminal, the K BFR procedures and one BFD RS set corresponding to each of the K BFR procedures according to a predefined rule.

3. The method according to claim 1, wherein the reference signal associated with the CORESET group is at least one reference signal in quasi-co-location (QCL) parameters of a CORESET in the CORESET group.

4. The method according to claim 1, wherein the performing the beam failure processing according to the reference signal in the BFD RS set corresponding to the BFR procedure or the reference signal associated with the CORESET group corresponding to the BFR procedure:
when measurement values of all reference signals corresponding to a first BFR procedure are detected to be worse than a first threshold, reporting, to a network device, at least one of an index of the first BFR procedure, an index of the reference signal corresponding to the first BFR procedure, an index of the BFD RS set corresponding to the first BFR procedure, an index of the CORESET corresponding to the first BFR procedure, and an index of the CORESET group corresponding to the first BFR procedure;
wherein the first BFR procedure is any one of the K BFR procedures.

5. A beam failure processing method, comprising:
obtaining at least one control resource set (CORESET) configured by a network device, wherein the CORESET comprises two transmission configuration indication (TCI) states;
determining a beam failure detection reference signal (BFD RS) set according to reference signals associated with the TCI states; and
performing a beam failure processing according to reference signals in the BFD RS set;
wherein the BFD RS set comprises at least one of:
a first reference signal set and a second reference signal set; or,
a third reference signal set;

wherein the first reference signal set comprises: a reference signal associated with a first TCI state of the two TCI states comprised in at least one of the CORESET, or reference signals associated with a part of quasi-co-location D type (QCL-TypeD) parameters of the first TCI state, or reference signals associated with all QCL-TypeD parameters of the first TCI state;

the second reference signal set comprises: a reference signal associated with a second TCI state of the two TCI states comprised in at least one of the CORESET, or reference signals associated with a part of QCL-TypeD parameters of the second TCI state, or reference signals associated with all QCL-TypeD parameters of the second TCI state;

the third reference signal set comprises: reference signals associated with the two TCI states of a target CORESET, or reference signals associated with a part of QCL-TypeD parameters of the two TCI states of a target CORESET, or reference signals associated with all QCL-TypeD parameters of the two TCI states of a target CORESET, wherein the target CORESET is one of the at least one CORESET, or all of the at least one CORESET.

6. The method according to claim 5, wherein the first TCI state is a TCI state corresponding to a port with a lowest index of a Physical downlink control channel Demodulation Reference Signal (PDCCH DMRS);

the second TCI state is a TCI state corresponding to a port with a next lowest index or a highest index of the PDCCH DMRS; wherein the next lowest index is higher than the lowest index.

7. The method according to claim 5, wherein when the target CORESET is one of the at least one CORESET, the target CORESET is a CORESET with a lowest index in the at least one CORESET, or a CORESET of which a higher-layer parameter value is a specific value in the at least one CORESET, or any one of the at least one target CORESET.

8. The method according to claim 5, wherein the performing the beam failure processing according to the reference signals in the BFD RS set comprises:

when the BFD RS comprises a first reference signal set and a second reference signal set, reporting a beam failure event to the network device when measurement values of all reference signals in the first reference signal set or the second reference signal set are detected to be worse than a first threshold; or when the BFD RS comprises a third reference signal set, reporting a beam failure event to the network device when the measurement values of all reference signals in the third reference signal set are detected to be worse than a first threshold; or when the BFD RS comprises a third reference signal set, reporting a beam failure event to the network device when the measurement values of all reference signals associated with one TCI state in the third reference signal set are detected to be worse than a first threshold.

9. The method according to claim 8, wherein the reporting the beam failure event to the network device comprises:

reporting a candidate beam corresponding to the first reference signal set to the network device when the measurement values of all reference signals in the first reference signal set are detected to be worse than the first threshold; or reporting a candidate beam corresponding to the second reference signal set to the network device when the measurement values of all reference signals in the second reference signal set are detected to be worse than the first threshold; or reporting two candidate beams corresponding to the third reference signal set to the network device when the measurement values of all reference signals in the third reference signal set are detected to be worse than a first threshold; or when the measurement values of all reference signals associated with one TCI state in the third reference signal set are detected to be worse than a first threshold, reporting candidate beams corresponding to a set including all reference signal associated with the one TCI state to the network device; or when the measurement values of all reference signals associated with one TCI state in the third reference signal set are detected to be worse than a first threshold, reporting two candidate beams corresponding to the third reference signal set to the network device.

10. A terminal, comprising: a transceiver, a memory, a processor and a program stored on the memory and executable on the processor, wherein the processor executes the program to perform the beam failure processing method according to claim 1.

11. The terminal according to claim 10, wherein the processor executes the program to perform at least one of:

obtaining the K BFR procedures configured by a network device for a terminal and one BFD RS set configured by the network device for each of the K BFR procedures;

obtaining the K BFR procedures configured by a network device for a terminal and one CORESET group configured by the network device for each of the K BFR procedures;

obtaining K BFD RS sets configured by a network device for a terminal and determining, by the terminal, the K BFR procedures and one BFD RS set corresponding to each of the K BFR procedures according to a predefined rule; or determining, by a terminal, the K BFR procedures and one BFD RS set corresponding to each of the K BFR procedures according to a predefined rule.

12. The terminal according to claim 10, wherein the reference signal associated with the CORESET group is at least one reference signal in quasi-co-location (QCL) parameters of a CORESET in the CORESET group;

the processor executes the program to perform:

when measurement values of all reference signals corresponding to a first BFR procedure are detected to be worse than a first threshold, reporting, to a network device, at least one of an index of the first BFR procedure, an index of the reference signal corresponding to the first BFR procedure, an index of the BFD RS set corresponding to the first BFR procedure, an index of the CORESET corresponding to the first BFR procedure, and an index of the CORESET group corresponding to the first BFR procedure;

wherein the first BFR procedure is any one of the K BFR procedures.

13. A terminal, comprising: a transceiver, a memory, a processor, and a program stored on the memory and executable on the processor, wherein the processor executes the program to perform:

obtaining at least one control resource set (CORESET) configured by a network device, wherein the CORESET comprises two transmission configuration indication (TCI) states; determining a beam failure detection reference signal (BFD RS) set according to reference signals associated with the TCI states; and performing a beam failure processing according to a reference signals in the BFD RS set;

wherein the BFD RS set comprises at least one of:

a first reference signal set and a second reference signal set; or, a third reference signal set;

wherein the first reference signal set comprises: a reference signal associated with a first TCI state of the two TCI states comprised in at least one of the CORESET, or reference signals associated with a part of quasi-co-location D type (QCL-TypeD) parameters of the first TCI state, or reference signals associated with all QCL-TypeD parameters of the first TCI state;

the second reference signal set comprises: a reference signal associated with a second TCI state of the two TCI states comprised in at least one of the CORESET, or reference signals associated with a part of QCL-TypeD parameters of the second TCI state, or reference signals associated with all QCL-TypeD parameters of the second TCI state;

the third reference signal set comprises: reference signals associated with the two TCI states of a target CORESET, or reference signals associated with a part of QCL-TypeD parameters of the two TCI states of a target CORESET, or reference signals associated with all QCL-TypeD parameters of the two TCI states of a target CORESET, wherein the target CORESET is one of the at least one CORESET, or all of the at least one CORESET.

14. The terminal according to claim 13, wherein the first TCI state is a TCI state corresponding to a port with a lowest index of a Physical downlink control channel Demodulation Reference Signal (PDCCH DMRS);

the second TCI state is a TCI state corresponding to a port with a next lowest index or a highest index of the PDCCH DMRS; wherein the next lowest index is higher than the lowest index.

15. The terminal according to claim 13, wherein when the target CORESET is one of the at least one CORESET, the target CORESET is a CORESET with a lowest index in the at least one CORESET, or a CORESET of which a higher-layer parameter value is a specific value in the at least one CORESET, or any one of the at least one target CORESET.

16. The terminal according to claim 13, wherein the processor executes the program to perform:

when the BFD RS comprises a first reference signal set and a second reference signal set, reporting a beam failure event to the network device when measurement values of all reference signals in the first reference signal set or the second reference signal set are detected to be worse than a first threshold; or when the BFD RS comprises a third reference signal set, reporting a beam failure event to the network device when the measurement values of all reference signals in the third reference signal set are detected to be worse than a first threshold; or when the BFD RS comprises a third reference signal set, reporting a beam failure event to the network device when the measurement values of all reference signals associated with one TCI state in the third reference signal set are detected to be worse than a first threshold.

17. The terminal according to claim 16, wherein the processor executes the program to perform:

reporting a candidate beam corresponding to the first reference signal set to the network device when the measurement values of all reference signals in the first reference signal set are detected to be worse than the first threshold; or reporting a candidate beam corresponding to the second reference signal set to the network device when the measurement values of all reference signals in the second reference signal set are detected to be worse than the first threshold; or reporting two candidate beams corresponding to the third reference signal set to the network device when the measurement values of all reference signals in the third reference signal set are detected to be worse than a first threshold; or when the measurement values of all reference signals associated with one TCI state in the third reference signal set are detected to be worse than a first threshold, reporting candidate beams corresponding to a set including all reference signal associated with the one TCI state to the network device; or when the measurement values of all reference signals associated with one TCI state in the third reference signal set are detected to be worse than a first threshold, reporting two candidate beams corresponding to the third reference signal set to the network device.

* * * * *